US008824700B2

(12) United States Patent
Kanamori et al.

(10) Patent No.: US 8,824,700 B2
(45) Date of Patent: Sep. 2, 2014

(54) MULTI-INPUT NOISE SUPPRESSION DEVICE, MULTI-INPUT NOISE SUPPRESSION METHOD, PROGRAM THEREOF, AND INTEGRATED CIRCUIT THEREOF

(75) Inventors: Takeo Kanamori, Osaka (JP); Shinichi Yuzuriha, Osaka (JP); Yutaka Banba, Kanagawa (JP); Yasuhiro Terada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 13/497,299

(22) PCT Filed: Jul. 26, 2011

(86) PCT No.: PCT/JP2011/004219
§ 371 (c)(1), (2), (4) Date: Mar. 21, 2012

(87) PCT Pub. No.: WO2012/014451
PCT Pub. Date: Feb. 2, 2012

(65) Prior Publication Data

US 2012/0177223 A1 Jul. 12, 2012

(30) Foreign Application Priority Data

Jul. 26, 2010 (JP) ................................ 2010-167289

(51) Int. Cl.
*H04B 15/00* (2006.01)
*G10L 21/0208* (2013.01)
*G10L 21/0216* (2013.01)

(52) U.S. Cl.
CPC ......... *G10L 21/0208* (2013.01); *H04R 2430/25* (2013.01); *H04R 2410/01* (2013.01); *H04R 2410/05* (2013.01); *G10L 2021/02165* (2013.01)
USPC ........................................ 381/94.7; 381/94.2

(58) Field of Classification Search
CPC . G10L 21/02; G10L 21/0208; G10L 21/0224; G10L 2021/02165; H04R 3/005; H04R 25/407; H04R 2410/05; H03G 5/18; H04B 1/123
USPC ............................................... 381/94.2, 94.7
See application file for complete search history.

(56) References Cited

U.S. PATENT DOCUMENTS 6,999,541 B1 2/2006 Hui
7,171,246 B2 * 1/2007 Mattila et al. ................ 455/570

(Continued)

FOREIGN PATENT DOCUMENTS

CN 101091209 12/2007
CN 101238511 8/2008

(Continued)

OTHER PUBLICATIONS

European Search Report issued Feb. 10, 2014 in EP 11812053.4, which is a foreign counterpart to the present application.

(Continued)

*Primary Examiner* — Simon Sing
(74) *Attorney, Agent, or Firm* — Wenderoth, Lind & Ponack, L.L.P.

(57) ABSTRACT

A power spectrum estimation unit (200) obtains an estimated sound power spectrum $P_s(\omega)$, based on a power spectrum $P_1(\omega)$ and on a first calculated value obtained by at least multiplying a power spectrum $P_2(\omega)$ by a weight coefficient $A_2(\omega)$. A coefficient update unit (300) updates the weight coefficient $A_2(\omega)$ and a weight coefficient $A_1(\omega)$ so that a second calculated value approximates to the power spectrum $P_1(\omega)$. The second calculated value is obtained by adding at least two values obtained by multiplying the power spectrum $P_2(\omega)$ and the estimated target sound power spectrum $P_s(\omega)$ by the weight coefficient $A_2(\omega)$ and the weight coefficient $A_1(\omega)$, respectively.

14 Claims, 19 Drawing Sheets

(56) References Cited

U.S. PATENT DOCUMENTS

| | | | | |
|---|---|---|---|---|
| 7,289,586 | B2 | 10/2007 | Hui | |
| 7,577,262 | B2 | 8/2009 | Kanamori et al. | |
| 7,698,133 | B2 * | 4/2010 | Ichikawa | 704/226 |
| 8,112,272 | B2 | 2/2012 | Nagahama et al. | |
| 8,233,636 | B2 | 7/2012 | Sugiyama et al. | |
| 8,477,963 | B2 | 7/2013 | Sugiyama et al. | |
| 8,489,394 | B2 | 7/2013 | Sugiyama et al. | |
| 2003/0108214 | A1 | 6/2003 | Brennan et al. | |
| 2004/0185804 | A1 | 9/2004 | Kanamori et al. | |
| 2004/0258255 | A1 | 12/2004 | Zhang et al. | |
| 2006/0072693 | A1 | 4/2006 | Hui | |
| 2007/0021959 | A1 | 1/2007 | Goto | |
| 2007/0033020 | A1 | 2/2007 | (Kelleher) Francois et al. | |
| 2009/0055170 | A1 | 2/2009 | Nagahama | |
| 2009/0141912 | A1 | 6/2009 | Hiekata | |
| 2009/0196434 | A1 | 8/2009 | Sugiyama et al. | |
| 2009/0296958 | A1 * | 12/2009 | Sugiyama | 381/94.2 |
| 2010/0010808 | A1 | 1/2010 | Sugiyama et al. | |
| 2010/0014681 | A1 | 1/2010 | Sugiyama | |
| 2011/0131044 | A1 * | 6/2011 | Fukuda et al. | 704/246 |
| 2012/0288115 | A1 | 11/2012 | Sugiyama et al. | |
| 2012/0290296 | A1 | 11/2012 | Sugiyama et al. | |

FOREIGN PATENT DOCUMENTS

| | | |
|---|---|---|
| CN | 101300623 | 11/2008 |
| CN | 101627428 | 1/2010 |
| JP | 4-216599 | 8/1992 |
| JP | 2002-530922 | 9/2002 |
| JP | 2004-187283 | 7/2004 |
| JP | 2005-049364 | 2/2005 |
| JP | 2008-209768 | 9/2008 |
| JP | 2009-134102 | 6/2009 |
| JP | 2010-066478 | 3/2010 |
| WO | 00/30264 | 5/2000 |

OTHER PUBLICATIONS

Moisan E et al: "Soustraction Adaptative de Bruit Par Filtrage RII en Presence de References Multiples", Colloque sur le Traitement du Signal et Des Images. Juan Les Pins. Sep. 16-20, 1991; [Colloque Sur le Traitement du Signal et Des Images], Nice, Gretsi, FR, vol. Colloque 13, Sep. 16, 1991. pp. 553-556. XP000242835, p. 554. paragraph 3)-p. 555. paragraph 4); figure 2.

Cohen I et al: "Speech enhancement based on a microphone array and log-spectral amplitude estimation", Electrical and Electronics Engineers in Israel, 2002. The 22nd Convention of Dec. 1, 2002. Piscataway. NJ. USA. IEEE. Jan. 1, 2002, pp. 4-6, XP010631024, ISBN: 978-0-7803-7693-9 the whole document.

Chinese Office Action, issued Jan. 26, 2014 in corresponding Chinese Application No. 201180004046.5 (with partial English translation).

International Search Report issued Aug. 30, 2011 in International (PCT) Application No. PCT/JP2011/004219.

Tomohiro Amitani, Kensaku Fujii, Arata Kawamura, Yoshio Itoh, and Yutaka Fukui, "A Study on Microphone Array Using Signal Analysis and Synthesis" IEIC Technical Report (Institute of Electronics Information and Communication Engineers), vol. 102, No. 606, Jan. 2003, p. 41-46, with English abstract.

Joerg Meyer, Klaus Uwe Simmer, Multi-channnel speech enhancement in a car environment using Wiener filtering and spectral subtraction, Acoustics, Speech, and Signal Processing, 1997. ICASSP-97., 1997 IEEE International Conference on, Apr. 1997, p. 1167-1170.

* cited by examiner

MULTI-INPUT NOISE SUPPRESSION DEVICE, MULTI-INPUT NOISE SUPPRESSION METHOD, PROGRAM THEREOF, AND INTEGRATED CIRCUIT THEREOF

TECHNICAL FIELD

The present invention relates to multi-input noise suppression devices, multi-input noise suppression methods, programs thereof, and integrated circuits thereof. In particular, the present invention relates to a multi-input noise suppression device, a multi-input noise suppression method, a program thereof, and an integrated circuit thereof which suppress a noise component using a signal including a target sound component and the noise component.

BACKGROUND ART

As one example, a conventional noise suppression device suppresses a noise component using: a main signal where a target sound and a noise are mixed; and a noise reference signal (see Patent Literature 1, for example).

A noise suppression device (a microphone device) disclosed in Patent Literature 1 detects a state where only a noise desired to be suppressed is present, according to a level determination or the like. Then, the noise suppression device estimates a power spectrum of the noise included in a main signal, based on an average power spectrum ratio between the main signal and a noise reference signal and on a power spectrum of the noise reference signal.

Following this, a filter coefficient for suppressing an estimated noise component is determined, and filtering is performed on the main signal to suppress the noise component. Hereinafter, the technique disclosed in Patent Literature 1 to suppress the noise component may also be referred to as the conventional technique A.

CITATION LIST

Patent Literature

[PTL 1]
Japanese Unexamined Patent Application Publication No. 2004-187283

SUMMARY OF INVENTION

Technical Problem

The aforementioned conventional technique A, however, has a problem as follows.

More specifically, in order for the noise suppression device to appropriately perform noise suppression according to the conventional technique A, it is necessary to calculate the average power spectrum ratio in time frames where no target sound components are present.

Suppose that detection of occurrence states of a target sound component and a noise component is the premise as with the conventional technique A. In such a case, when a state (frame) where a minimal target sound is included is determined to be a noise frame, for example, oversuppression is caused. This results in a decrease in sound quality. Moreover, when a frequency of occurrence of the target sound is high, this means that time frames used for calculating the average power spectrum ratio cannot be obtained and that the noise suppression device thus cannot follow variations in a noise transfer system.

That is, when the detection of occurrence states of the target sound component and the noise component is the premise as with the conventional technique A, there is a problem that processing is complex to obtain a sound signal where the noise component is suppressed with high accuracy.

The present invention is conceived in view of the aforementioned problem and has an object to provide a multi-input noise suppression device and so forth capable of obtaining, by a simple process, a sound signal where a noise component is suppressed with high accuracy.

Solution to Problem

In order to solve the aforementioned problem, the multi-input noise suppression device in an aspect of the present invention is a multi-input noise suppression device which performs a process using a main signal and at least one noise reference signal, the main signal including a target sound component and a noise component and the noise reference signal including a noise component. The multi-input noise suppression device includes: a power spectrum calculation unit which performs a calculation process to obtain a main power spectrum of the main signal and a reference power spectrum of the noise reference signal, after each expiration of a unit clock time corresponding to a unit of sound processing; a power spectrum estimation unit which performs, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and a coefficient update unit which updates, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein the power spectrum estimation unit, in the estimation process, (i) obtains the estimated target power spectrum by at least multiplying the reference power spectrum calculated upon an expiration of a $k+1^{th}$ unit clock time by the first weight coefficient updated by the coefficient update unit upon an expiration of a $k^{th}$ unit clock time, and (ii) outputs the obtained estimated target power spectrum, k being an integer equal to or greater than 1.

With this configuration, the first weight coefficient and the second weight coefficient are updated after each expiration of the unit clock time so that the second calculated value approximates to the main power spectrum. The reference power spectrum and the estimated target sound power spectrum are to be multiplied by the first weight coefficient and the second weight coefficient, respectively.

The second calculated value is obtained by adding at least two values obtained by multiplying the reference power spectrum and the estimated target sound power spectrum by the first weight coefficient and the second weight coefficient, respectively. That is to say, the second calculated value includes a part of the reference power spectrum and a part of the estimated target sound power spectrum.

To be more specific, the first weight coefficient and the second weight coefficient are updated after each expiration of the unit clock time so that the second calculated value approximates to the main power spectrum of the main signal including the target sound component and the noise component. Here, the second calculated value includes: a part of the reference power spectrum of the noise reference signal including the noise component; and a part of the estimated target sound power spectrum assumed to be the power spectrum of the target sound.

Accordingly, after each expiration of the unit clock time, each of the first weight coefficient and the second weight coefficient converges to a value accurately indicating the amount of target sound component and the amount of noise component included in the main signal.

Moreover, the power spectrum estimation unit obtains the estimated target sound power spectrum, by at least multiplying the reference power spectrum calculated upon the expiration of the k+1$^{th}$ unit clock time by the first weight coefficient updated upon the expiration of the k$^{th}$ unit clock time. Then, the power spectrum estimation unit outputs the estimated target sound power spectrum.

Accordingly, since the first weight coefficient converging to the value accurately indicating the amount of target sound component and the amount of noise component is used, the obtained estimated target sound power spectrum exceedingly approximates to the power spectrum of the target sound. Therefore, the sound signal (i.e., the estimated target sound power spectrum) where the noise component is suppressed with high accuracy can be obtained (estimated). As a result, the noise component can be suppressed with high accuracy.

According to the aforementioned conventional technique A, it is necessary to detect the occurrence states of the target sound component and the noise component and, on account of this, the processing is complex to suppress the noise component with high accuracy.

On the other hand, the multi-input noise suppression device in an aspect of the present invention obtains the estimated target sound power spectrum, based on the main power spectrum of the main signal and on the first calculated value obtained from the reference power spectrum of the noise reference signal. Thus, it is not necessary to detect the occurrence states of the target sound component and the noise component. To be more specific, the multi-input noise suppression device in an aspect of the present invention can obtain (estimate), by a simple process, the sound signal (i.e., the estimated target sound power spectrum) where the noise component is suppressed with high accuracy.

Moreover, preferably, the power spectrum estimation unit may at least subtract the first calculated value from the main power spectrum to obtain the estimated target sound power spectrum that is different from a result obtained by simply subtracting the first calculated value from the main power spectrum.

Furthermore, preferably, the coefficient update unit may update the first weight coefficient and the second weight coefficient according to a least mean square (LMS) method so that a difference between the main power spectrum and the second calculated value approximates to zero.

With this configuration, the target sound where the noise is suppressed with high accuracy can be estimated via a small amount of computation.

Moreover, preferably, the coefficient update unit may update the first weight coefficient and the second weight coefficient so that each of the first weight coefficient and the second weight coefficient is nonnegative.

With this configuration, convergence performance of each of the weight coefficients can be increased and, therefore, time required to estimate the target sound where the noise is suppressed can be reduced.

Furthermore, preferably, the power spectrum estimation unit may include a filter calculation unit having a filter characteristic dependent on a difference between the main power spectrum and the first calculated value, and the filter calculation unit may obtain the estimated target sound power spectrum by filtering the main power spectrum using the filter characteristic.

With this configuration, the coefficient update unit subsequent to the power spectrum estimation unit can obtain an appropriate error signal. Thus, the accuracy in estimating the weight coefficients can be increased.

Moreover, preferably, the multi-input suppression device may perform a process using a plurality of noise reference signals, and one of a plurality of reference power spectrums respectively corresponding to the plurality of noise reference signals may be a fixed value.

With this configuration, influence of stationary noise existing due to, for example, intrinsic noise of the current device or a device connected can be removed. On this account, the target sound where the noise component is suppressed with higher accuracy can be estimated.

Furthermore, preferably, the power spectrum calculation unit may calculate the main power spectrum and the reference power spectrum on a frame-by-frame basis after each expiration of the unit clock time, the power spectrum estimation unit may obtain the estimated target sound power spectrum on a frame-by-frame basis after each expiration of the unit clock time, the coefficient update unit may include a time averaging unit which calculates a time average indicating an average per frame for each of the reference power spectrum and the estimated target sound power spectrum, and the coefficient update unit may update the first weight coefficient and the second weight coefficient so that the time average of the main power spectrum calculated by the time averaging unit approximates to a value dependent on a sum of the time average of the reference power spectrum and the time average of the estimated target sound power spectrum.

With this configuration, when the frame time length used for frequency analysis is short or when a rate of updating the weight coefficients is to be increased, the convergence performance of the weight coefficients can be stabilized.

Moreover, preferably, the multi-input noise suppression device as may further include a target sound waveform extraction unit which estimates the power spectrum of the target sound using the first weight coefficient and the second weight coefficient updated by the coefficient update unit, and at least perform a transform to express the estimated power spectrum of the target sound in a time domain so as to extract a signal waveform of the target sound.

With this configuration, the signal waveform of the target sound obtained by suppressing the noise with high accuracy can be extracted.

Furthermore, preferably, the multi-input noise suppression device may further include: a main microphone which has a sensitivity in a direction of an output source of the target sound and receives the main signal; and a reference microphone which has a least or minimum sensitivity in the direction of the output source of the target sound and receives the noise reference signal.

With this configuration, the function as a directional microphone having an increased directivity and increased noise suppression performance can be obtained.

Moreover, preferably, whenever updating the first weight coefficient, the coefficient update unit may output the updated first weight coefficient, and the multi-input noise suppression device may further include a storage unit which stores, every time the coefficient update unit outputs the first weight coefficient, the first weight coefficient outputted most recently from the coefficient update unit.

With this configuration, at least the timing at which the power spectrum estimation unit uses the first weight coefficient can be set appropriately. Thus, the target sound where the noise is suppressed with higher accuracy can be estimated.

Furthermore, preferably, the multi-input noise suppression device may further include a determination unit which determines whether or not the number of updates performed by the coefficient update unit on the first weight coefficient and the second weight coefficient is a predetermined number of times or more, wherein the power spectrum estimation unit performs the estimation process when the determination unit determines that the number of updates is smaller than the predetermined number of times, and the coefficient update unit updates the first weight coefficient and the second weight coefficient using the first weight coefficient and the second weight coefficient updated last time, when the determination unit determines that the number of updates is smaller than the predetermined number of times.

With this configuration, time required for the convergence of the weight coefficients within the unit time period can be reduced, and the capability to follow the variations in the transfer system can be increased. Thus, the target sound where the noise is suppressed with higher accuracy can be estimated.

The multi-input noise suppression method in an aspect of the present invention is a multi-input noise suppression method for performing a process using a main signal and at least one noise reference signal, the main signal including a target sound component and a noise component and the noise reference signal including a noise component. The multi-input noise suppression method includes: performing a calculation process to obtain a main power spectrum of the main signal and, a reference power spectrum of the noise reference signal, after each expiration of a unit clock time corresponding to a unit of sound processing; performing, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and updating, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein, in the performing an estimation process, (i) the estimated target power spectrum is obtained by at least multiplying the reference power spectrum calculated upon an expiration of a $k+1^{th}$ unit clock time by the first weight coefficient updated upon an expiration of a $k^{th}$ unit clock time, and (ii) the obtained estimated target power spectrum is outputted, k being an integer equal to or greater than 1.

The program in an aspect of the present invention is a program executed by a computer which performs a process using a main signal and at least one noise reference signal, the main signal including a target sound component and a noise component and the noise reference signal including a noise component. The program includes: performing a calculation process to obtain a main power spectrum of the main signal and a reference power spectrum of the noise reference signal, after each expiration of a unit clock time corresponding to a unit of sound processing; performing, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and updating, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein, in the performing an estimation process, (i) the estimated target power spectrum is obtained by at least multiplying the reference power spectrum calculated upon an expiration of a $k+1^{th}$ unit clock time by the first weight coefficient updated upon an expiration of a $k^{th}$ unit clock time, and (ii) the obtained estimated target power spectrum is outputted, k being an integer equal to or greater than 1.

The integrated circuit in an aspect of the present invention is an integrated circuit which performs a process using a main signal and at least one noise reference signal, the main signal including a target sound component and a noise component and the noise reference signal including a noise component. The integrated circuit include: a power spectrum calculation unit which performs a calculation process to obtain a main power spectrum of the main signal and a reference power spectrum of the noise reference signal, after each expiration of a unit clock time corresponding to a unit of sound processing; a power spectrum estimation unit which performs, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and a coefficient update unit which updates, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein the power spectrum estimation unit, in the estimation process, (i) obtains the estimated target power spectrum by at least multiplying the reference power spectrum calculated upon an expiration of a $k+1^{th}$ unit clock time by the first weight coefficient updated by the coefficient update unit upon an expiration of a $k^{th}$ unit clock time, and (ii) outputs the obtained estimated target power spectrum, k being an integer equal to or greater than 1.

Advantageous Effects of Invention

The present invention is capable of obtaining, by a simple process, a sound signal where a noise component is suppressed with accuracy.

BRIEF DESCRIPTION OF DRAWINGS

FIG. 1 is a block diagram showing a multi-input noise suppression device in Embodiment 1.

FIG. 2 is a block diagram showing an example of a configuration of the multi-input noise suppression device in Embodiment 1.

FIG. 3 is a diagram explaining signals inputted into the multi-input noise suppression device in Embodiment 1.

FIG. 4 is a block diagram showing an example of a configuration of a coefficient update unit in Embodiment 1.

FIG. 5 is a block diagram showing another example of the configuration of the coefficient update unit in Embodiment 1.

FIG. 6 is a block diagram showing another example of a configuration of a power spectrum estimation unit in Embodiment 1.

FIG. 7 is a flowchart showing a noise suppression process.

FIG. 8 is a diagram showing examples of waveforms of signals to be inputted into the multi-input noise suppression device in Embodiment 1.

FIG. 9 is a diagram showing an example of temporal changes and convergence values of weight coefficients obtained by the multi-input noise suppression device in Embodiment 1.

FIG. 10 is a block diagram showing another example of the configuration of the power spectrum estimation unit in Embodiment 1.

FIG. 11 is a block diagram showing another example of the configuration of the coefficient update unit in Embodiment 1.

FIG. 12 is a block diagram showing another example of the multi-input noise suppression device in Embodiment 1.

FIG. 13 is a block diagram showing a multi-input noise suppression device in Embodiment 2.

FIG. 14 is a block diagram showing an example of a configuration of a target sound waveform extraction unit in Embodiment 2.

FIG. 15 is a flowchart showing a noise suppression process A.

FIG. 16 is a diagram showing waveforms of input and output signals used in calculator simulation in Embodiment 2.

FIG. 17 is a diagram explaining signals to be inputted into the multi-input noise suppression device in Embodiment 2 in the case where crosstalk exists between a plurality of noise reference signals.

FIG. 18 is a diagram showing waveforms of input and output signals used in calculator simulation in Embodiment 2.

FIG. 19 is a block diagram showing another example of the multi-input noise suppression device in Embodiment 2.

FIG. 20 is a block diagram showing a multi-input noise suppression device in Embodiment 3.

FIG. 21 is a diagram showing an example of directional characteristic patterns of signals to be inputted into and outputted from the multi-input noise suppression device in Embodiment 3.

DESCRIPTION OF EMBODIMENTS

The following is a detailed description of Embodiments according to the present invention, with reference to the drawings. It should be noted that each of Embodiments below describes only a preferred specific example. Note that numerical values, shapes, components, locations and connection states of the components, steps, a sequence of the steps, and so forth described in Embodiments below are only examples, and the present invention is not limited to these examples.

The present invention is determined only by the scope of the claims. Thus, among the components described in Embodiments below, the components that are not described in independent claims indicating top concepts according to the present invention are not necessarily required to achieve the object in the present invention. However, these components are described to implement more preferred embodiments.

Moreover, note that components which are identical in Embodiments are denoted by the same reference sign. These identical components also have the same name and the same function. On account of this, detailed descriptions on these components may not be repeated.

[Embodiment 1]

Figure 1:
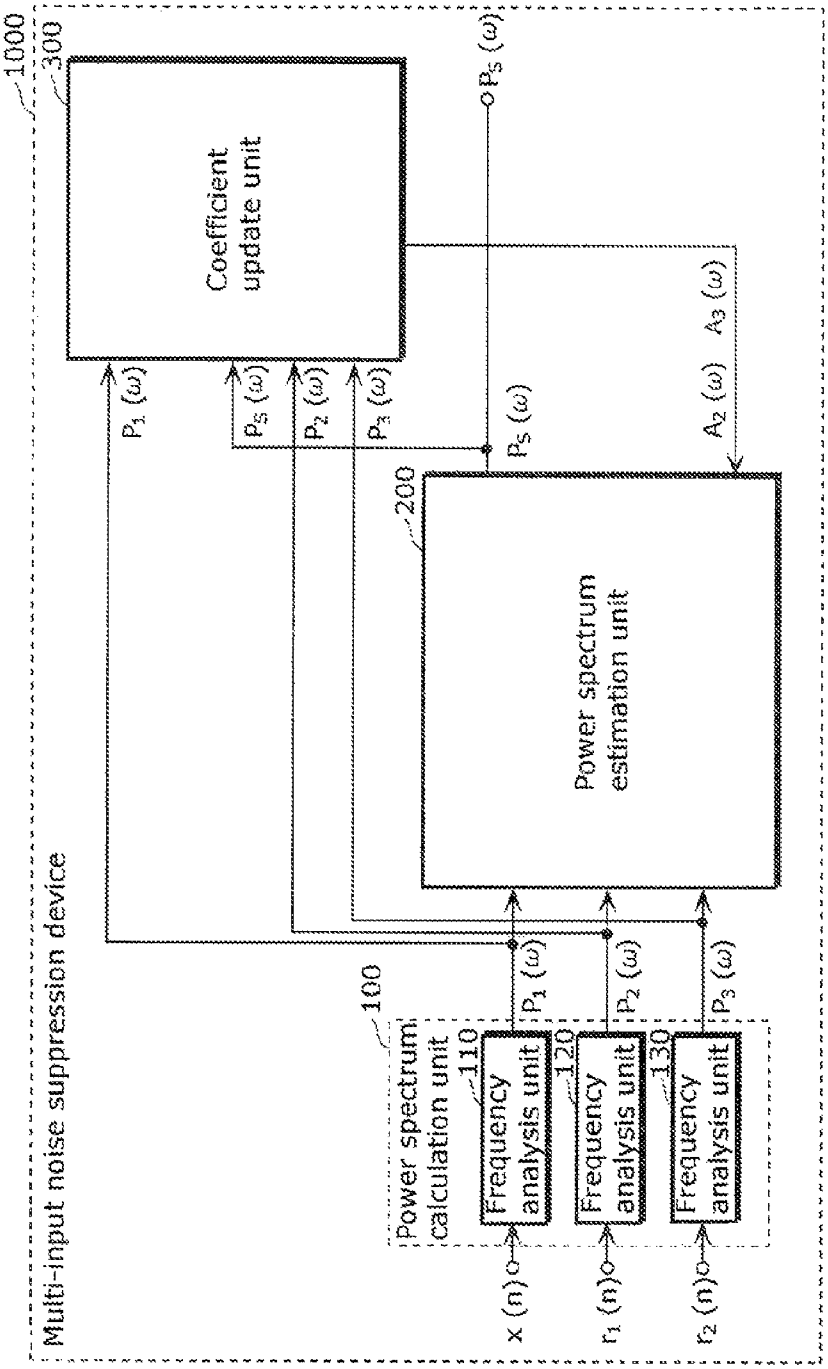
[FIG. 1]

FIG. 1 is a block diagram showing a multi-input noise suppression device 1000 in Embodiment 1.

As shown in FIG. 1, the multi-input noise suppression device 1000 includes a power spectrum calculation unit 100, a power spectrum estimation unit 200, and a coefficient update unit 300.

Although described in detail later, the power spectrum calculation unit 100 calculates a main power spectrum and a reference power spectrum after each expiration of a unit clock time. The main power spectrum refers to a power spectrum of a main signal x(n), and the reference power spectrum refers to a power spectrum of a noise reference signal.

The power spectrum calculation unit 100 includes a frequency analysis units 110, 120, and 130.

The frequency analysis unit 110 performs frequency analysis (i.e., time-frequency transform) on the main signal x(n), and then outputs a power spectrum $P_1(\omega)$ obtained as a result of the frequency analysis. The main signal x(n) includes a target sound component and a noise component.

In the present specification, the target sound component refers to a component of a target sound, and the target sound refers to a sound including only a component of a required sound. For example, a sound that is not required is referred to as a noise in the present specification. That is to say, the target sound refers to the sound that includes only the component of the required sound and does not include a noise component. Moreover, in the present specification, "ω" is indicated by "2nf".

The frequency analysis unit 120 performs frequency analysis on a noise component included in the main signal x(n) or on a noise reference signal $r_1(n)$ including a part of the noise component. Then, the frequency analysis unit 120 outputs a power spectrum $P_2(\omega)$ obtained as a result of the frequency analysis.

The frequency analysis unit 130 performs frequency analysis on a noise component included in the main signal x(n) or on a noise reference signal $r_2(n)$ including a part of the noise component. Then, the frequency analysis unit 120 outputs a power spectrum $P_3(\omega)$ obtained as a result of the frequency analysis.

In other words, each of the noise reference signals $r_1(n)$ and $r_2(n)$ includes a noise component.

Every time the power spectrum calculation unit 100 performs the calculation process, the power spectrum estimation unit 200 performs an estimation process to obtain an estimated target sound power spectrum that is assumed to be a power spectrum of the target sound, based on the main power spectrum and on a first calculated value obtained by at least multiplying the reference power spectrum by a weight coefficient. The details are described later.

In the following, an estimated target power spectrum $P_s(\omega)$ may also be indicated simply as "$P_s(\omega)$".

The power spectrum estimation unit 200 receives the power spectrums $P_1(\omega)$, $P_2(\omega)$, and $P_3(\omega)$ outputted from the frequency analysis units 110, 120, and 130, respectively. Moreover, the power spectrum estimation unit 200 receives weight coefficients $A_2(\omega)$ and $A_3(\omega)$ outputted from the coefficient update unit 300.

In the following, the power spectrums $P_1(\omega)$, $P_2(\omega)$, and $P_3(\omega)$ may also be indicated simply as $P_1(\omega)$, $P_2(\omega)$, and $P_3(\omega)$.

The power spectrum estimation unit 200 suppresses noise components included in the power spectrum $P_1(\omega)$ of the main signal x(n), using the power spectrums $P_1(\omega)$, $P_2(\omega)$, and $P_3(\omega)$ and the weight coefficients $A_2(\omega)$ and $A_3(\omega)$. Then, the power spectrum estimation unit 200 outputs the estimated target sound power spectrum $P_s(\omega)$. The details are described later.

The coefficient update unit 300 receives the power spectrums $P_1(\omega)$, $P_2(\omega)$, and $P_3(\omega)$ outputted from the frequency analysis units 110, 120, and 130, respectively, and also receives the estimated target sound power spectrum $P_s(\omega)$ outputted from the power spectrum estimation unit 200. Moreover, whenever updating a first weight coefficient, the coefficient update unit 300 outputs the updated first weight coefficient. Here, the first weight coefficient refers to the weight coefficient $A_2(\omega)$ or the weight coefficient $A_3(\omega)$.

The weight coefficients $A_2(\omega)$ and $A_3(\omega)$ outputted from the coefficient update unit 300 are inputted into the power spectrum estimation unit 200 so as to be used in the process for obtaining an estimated target sound power spectrum corresponding to a next processing clock time.

Figure 2:
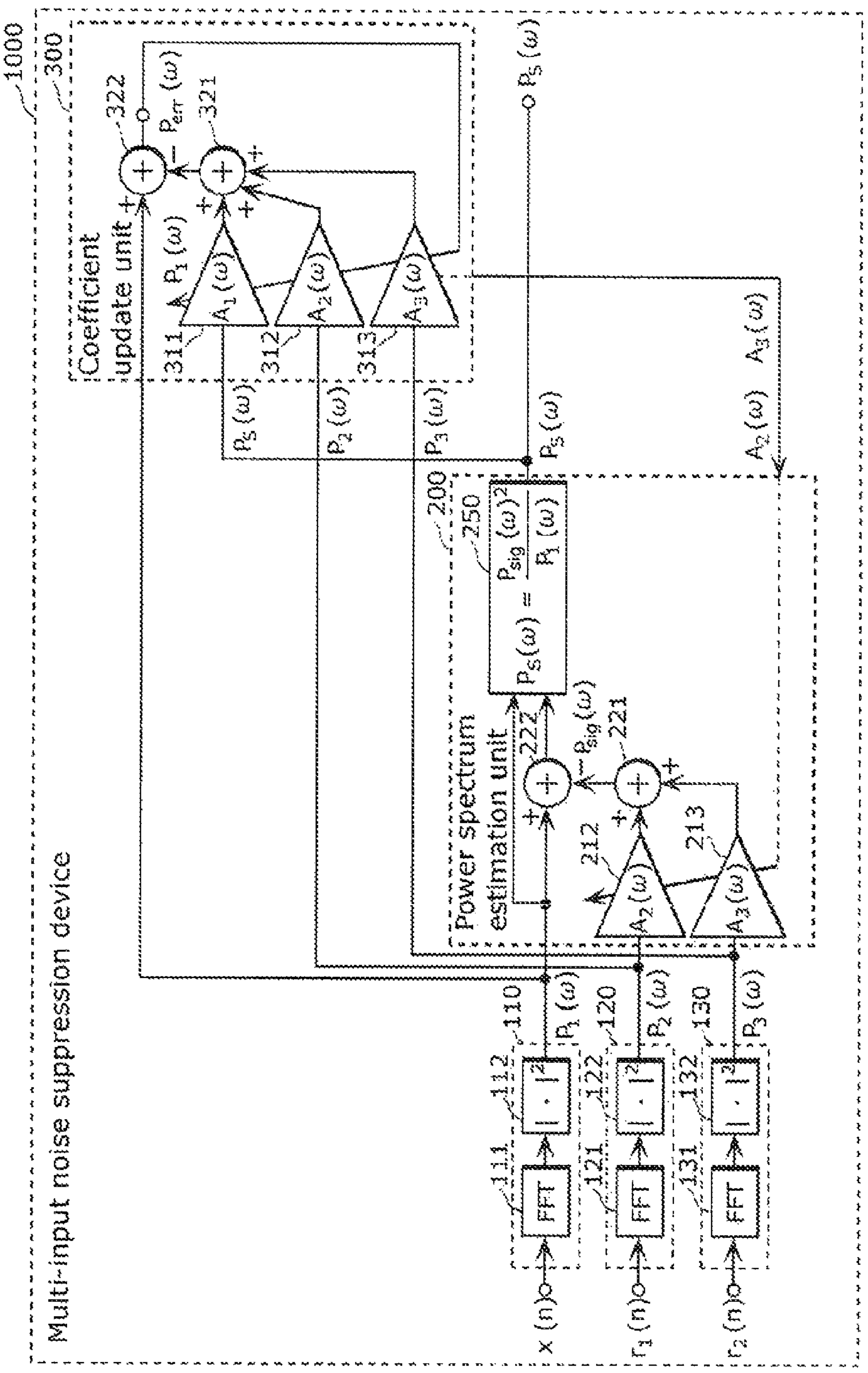
[FIG. 2]

FIG. 2 is a block diagram showing examples of configurations of the frequency analysis units 110, 120, and 130 included in the power spectrum calculation unit 100, the power spectrum estimation unit 200, and the coefficient update unit 300.

The frequency analysis unit 110 includes a fast Fourier transform (FFT) calculation unit 111 and a power calculation unit 112. The FFT calculation unit 111 performs FFT calculation on the main signal x(n) and then outputs a spectrum obtained as a result of the FFT calculation. In the present specification, FFT calculation is performed on a frame-by-frame basis. Moreover, in the present specification, a frame refers to a frame period during which a sub-signal (i.e., a signal corresponding to a fixed time period) is processed by the FFT calculation. The fixed time period is 100 milliseconds, for example. When a sub-signal corresponding to 100 milliseconds, out of the signal, is to be processed by the FFT calculation, for example, this means that the frame is assigned to the sub-signal of 100 milliseconds.

In Embodiment 1, the frame period is represented by a value within a range expresses as, for instance, 48k/S (where $64 \leq S \leq 4096$). As an example, the frame period is 100 milliseconds.

A plurality of consecutive frames are set so that two adjacent frames, among the consecutive frames, overlap each other. A length by which the frames are shifted so that the two adjacent frames overlap each other is referred to as a frame shift length or a frame shift amount.

It should be noted that the plurality of consecutive frames may be set so that two adjacent frames, among the consecutive frames, do not overlap each other.

A frame corresponds to a certain clock time. In the following, the clock time corresponding to the frame may also be referred to as the frame clock time. A signal present from the frame clock time to a next frame clock time between which the frame period elapses is a target to be processed in one FFT calculation. The frame clock time is a unit clock time corresponding to a unit of sound processing. In the following, the frame clock time may also be referred to as the clock time, the processing clock time, or the unit clock time.

The plurality of frames correspond to a plurality of frame clock times. In the present specification, the plurality of frame clock times are indicated as, for example, clock times T1, T2, . . . , and Tn. In the following, a process performed for the frame may also be referred to as the frame processing.

The power calculation unit 112 calculates the square of an absolute value of the spectrum outputted from the FFT calculation unit, for each of frequency components. Then, the power calculation unit 112 outputs a result of the calculation as the power spectrum $P_1(\omega)$.

In the present specification, "for each of frequency components" refers to "for each predetermined frequency". The predetermined frequency is represented by a value within a range expressed as, for example, 48k/S (where $64 \leq S \leq 4096$). When S is 1024, 48k/1024=46.9, meaning that the predetermined frequency is about 47 Hz. In this case, the frequency components correspond to multiples of 47 (such as 47, 94, 141, . . . ).

The frequency analysis unit 120 includes an FFT calculation unit 121 and a power calculation unit 122. The FFT calculation units 121 performs FFT calculation on the noise reference signal $r_1(n)$ b, and then outputs a spectrum obtained as a result of the FFT calculation. The power calculation unit 122 calculates the square of an absolute value of the spectrum outputted from the FFT calculation unit 121, for each of frequency components. Then, the power calculation unit 122 outputs a result of the calculation as the power spectrum $P_2(\omega)$.

The frequency analysis unit 130 includes an FFT calculation unit 131 and a power calculation unit 132. The FFT calculation units 131 performs FFT calculation on the noise reference signal $r_2(n)$b, and then outputs a spectrum obtained as a result of the FFT calculation. The power calculation unit 132 calculates the square of an absolute value of the spectrum outputted from the FFT calculation unit 131, for each of frequency components. Then, the power calculation unit 132 outputs a result of the calculation as the power spectrum $P_3(\omega)$.

The power spectrum estimation unit 200 includes multiplication units 212 and 213. The multiplication unit 212 multiplies the power spectrum $P_2(\omega)$ by the weight coefficient $A_2(\omega)$ for each of the frequency components to weight the power spectrum $P_2(\omega)$. Then, the multiplication unit 212 outputs the weighted power spectrum.

The multiplication unit 213 multiplies the power spectrum $P_3(\omega)$ by the weight coefficient $A_3(\omega)$ for each of the frequency components to weight the power spectrum $P_3(\omega)$. Then, the multiplication unit 213 outputs the weighted power spectrum.

The power spectrum estimation unit 200 further includes an addition unit 221, a subtraction unit 222, and a filter calculation unit 250.

The addition unit 221 adds the two weighted power spectrums outputted from the multiplication units 212 and 213, respectively, for each of the frequency components. In the following, the power spectrum obtained as a result of the addition performed by the addition unit 221 may also be referred to as a first power spectrum. Then, the addition unit 221 outputs the first power spectrum.

The subtraction unit 222 subtracts the first power spectrum from the power spectrum $P_1(\omega)$ for each of the frequency components. In the following, the power spectrum obtained as a result of the subtraction performed by the subtraction unit 222 may also be referred to as a second power spectrum. Then, the subtraction unit 222 outputs the second power spectrum as a power spectrum $P_{sig}(\omega)$.

The filter calculation unit 250 calculates the estimated target sound power spectrum $P_s(\omega)$ using the power spectrum $P_1(\omega)$ and the power spectrum $P_{sig}(\omega)$, and then outputs the estimated target sound power spectrum $P_s(\omega)$.

The coefficient update unit 300 includes multiplication units 311, 312, and 313.

Although described in detail later, each of the multiplication units 311, 312, and 313 multiplies the power spectrum by a weight coefficient.

The coefficient update unit 300 further includes an addition unit 321 and a subtraction unit 322.

The addition unit 321 adds the three weighted power spectrums outputted from the multiplication units 311, 312 and 313, respectively, for each of the frequency components. Then, the addition unit 321 outputs a power spectrum obtained as a result of the addition.

Moreover, the coefficient update unit 300 further includes a time averaging unit 305 described later. It should be noted that, in FIG. 2, the time averaging unit 305 is not illustrated for the sake of simplification.

The subtraction unit 322 subtracts, from the power spectrum $P_1(\omega)$, the power spectrum outputted from the addition unit 321, for each of the frequency components. Then, the subtraction unit 322 outputs the power spectrum obtained as a result of the subtraction, as an estimated error power spectrum $P_{err}(\omega)$.

Weight coefficients $A_1(\omega)$, $A_2(\omega)$, and $A_3(\omega)$ are updated based on the estimated error power spectrum $P_{err}(\omega)$, (the estimated target sound power spectrum $P_s(\omega)$, and the power spectrums $P_2(\omega)$ and $P_3(\omega)$. In the following, each of the weight coefficients $A_2(\omega)$ and $A_3(\omega)$ may also be referred to as the first weight coefficient. Moreover, in the following, the weight coefficient $A_1(\omega)$ may also be referred to as a second weight coefficient.

Although described in detail later, each of the multiplication units 311, 312, and 313 weights the corresponding input signal at a next processing clock time, using the corresponding updated weight coefficient. Here, as shown in FIG. 2, each update performed on the weight coefficients $A_1(\omega)$, $A_2(\omega)$, and $A_3(\omega)$ is indicated by an arrow line commonly used in an adaptation algorithm. The arrow line goes across the multiplication units 311, 312, and 313. The details on the updates performed on the weight coefficients $A_1(\omega)$, $A_2(\omega)$, and $A_3(\omega)$ are described using Equations later when an operation is explained below.

Next, the operation performed by the multi-input noise suppression device 1000 is described.

It should be noted that, unless otherwise specified, when a first letter of a sign representing a signal is a lower-case letter, this signal is a time domain signal. Note also that when a first letter of a sign representing a signal is a capital letter, this signal indicates a complex spectrum including phase information and having been converted to the frequency domain. Moreover, note that when a first letter of a sign representing a signal is "P", this signal indicates a power spectrum.

Figure 3:
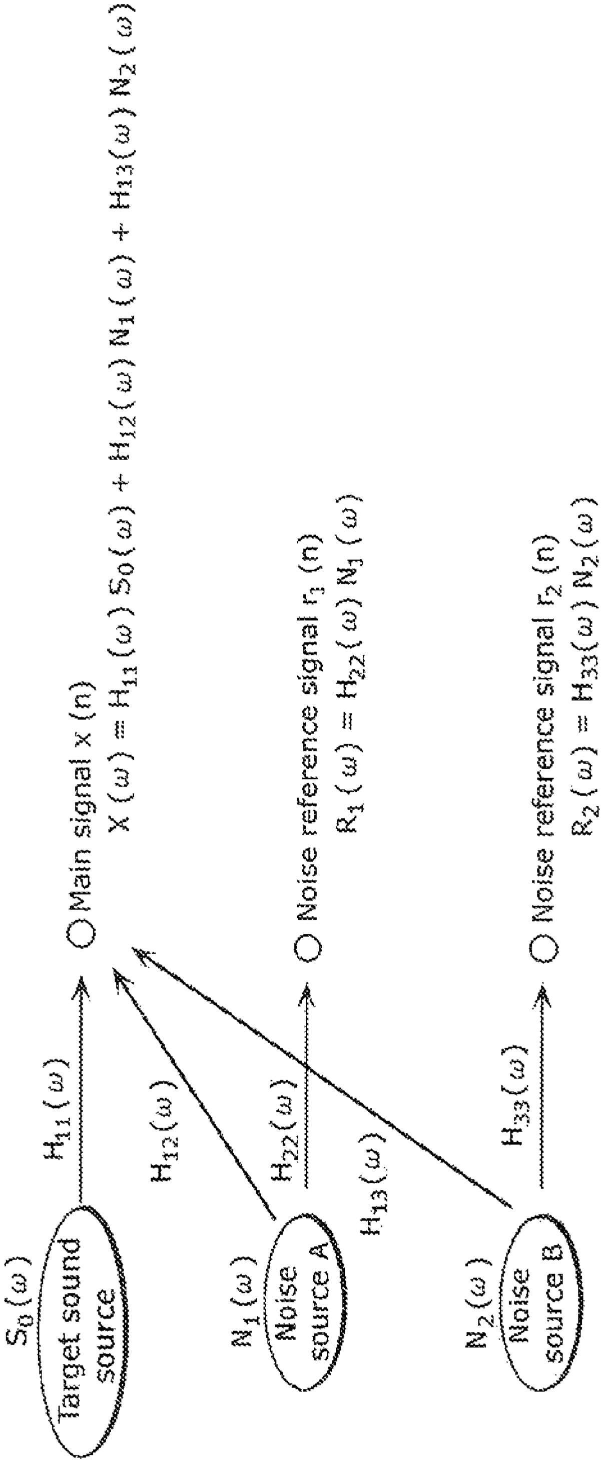
[FIG. 3]

The following describes a method of obtaining the estimated target sound power spectrum based on a relationship between the main signal x(n) and the noise reference signals $r_1(n)$ and $r_2(n)$, with reference to FIG. 3.

Here, the description is given on the assumption that there are: a target sound source emitting a target sound $S_0(\omega)$; and a noise source A and a noise source B emitting a noise $N_1(\omega)$ and a noise $N_2(\omega)$, respectively.

The main signal x(n) is observed to include signals where the target sound $S_0(\omega)$, the noise $N_1(\omega)$, and the noise $N_2(\omega)$ are multiplied by transfer characteristics $H_{11}(\omega)$, $H_{12}(\omega)$, and $H_{13}(\omega)$, respectively. Here, the transfer characteristic (i.e., a transfer function) refers to a function representing a sound change depending on a medium for transferring the sound. According to a frequency domain representation, the main signal x(n) is expressed by Equation 1 below.

[Math. 1]

$$X(\omega)=H_{11}(\omega)S_0(\omega)+H_{12}(\omega)N_1(\omega)+H_{13}(\omega)N_2(\omega) \quad \text{Equation 1}$$

In Equation 1, "$X(\omega)$" represents the spectrum of the main signal x(n).

Moreover, note that the noise reference signal $r_1(n)$ is expressed (observed) as a signal where the noise $N_1(\omega)$ is multiplied by a transfer characteristic $H_{22}(\omega)$. Furthermore, note that the noise reference signal $r_2(n)$ is expressed (observed) as a signal where the noise $N_2(\omega)$ is multiplied by a transfer characteristic $H_{33}(\omega)$.

According to the frequency domain representation, the noise reference signals $r_1(n)$ and $r_2(n)$ are expressed by Equation 2 and Equation 3, respectively, as below. In Equation 2, "$R_1(\omega)$" denotes the spectrum of the noise reference signal $r_1(n)$ in the frequency domain representation. In Equation 3, "$R_2(\omega)$" denotes the spectrum of the noise reference signal $r_2(n)$ in the frequency domain representation.

[Math. 2]

$$R_1(\omega)=H_{22}(\omega)N_1(\omega) \quad \text{Equation 2}$$

[Math. 3]

$$R_2(\omega)=H_{33}(\omega)N_2(\omega) \quad \text{Equation 3}$$

In Equations 1 to 3, when each of the noises $N_1(\omega)$ and $N_2(\omega)$ is a noise component, this means that each of the noise reference signals $r_1(n)$ and $r_2(n)$ includes the noise component included in the main signal x(n).

On the other hand, in Equations 1 to 3, when each of the noises $N_1(\omega)$ and $N_2(\omega)$ that have been multiplied by the transfer characteristics is a noise component, this means that the noise component included in the main signal x(n) and the noise components respectively included in the noise reference signals $r_1(n)$ and $r_2(n)$ are different.

Here, suppose that the estimated target sound power spectrum $P_s(\omega)$ assumed to be the power spectrum of the target sound component obtained by removing the noise component from the main signal $X(\omega)$ is expressed by Equation 4. In this case, the estimated target sound power spectrum $P_s(\omega)$ is obtained by calculating Equation 4 using Equations 1 to 3.

[Math. 4]

$$P_s(\omega)=|H_{11}(\omega)S_0(\omega)|^2 \quad \text{Equation 4}$$

Here, examples of the method for estimating the target sound using the main sound and the noise sound observed by the device include: a noise cancelling (or, canceller) method of cancelling a noise waveform using amplitude phase information; and a noise suppression (or, suppressor) method of performing processing on a power spectrum without using phase information. Note that Embodiment 1 employs the aforementioned noise suppression method.

Simply subtracting the noise reference signals $r_1(n)$ and $r_2(n)$ from the main signal x(n) cannot achieve a noise suppression effect. The input signals in Equations 1 to 3 are expressed using the transfer characteristics $H_{11}(\omega)$, $H_{22}(\omega)$, and $H_{33}(\omega)$. This is because, by weighing each of the noise reference signals $r_1(n)$ and $r_2(n)$, the necessity to estimate a noise component mixed into the main signal x(n) can be expressed.

The transfer characteristics $H_{11}(\omega)$, $H_{12}(\omega)$, $H_{13}(\omega)$, $H_{22}(\omega)$, and $H_{33}(\omega)$ vary, depending on positions and distances of the target sound source and the noise sources A and B with respect to the device (such as the multi-input noise suppression device 1000). Thus, simply because the noise reference signals $r_1(n)$ and $r_2(n)$ are subtracted from the main signal x(n) does not mean that the target sound can be estimated and that the noise suppression can be achieved.

The estimation method in Embodiment 1 according to the present invention performs processing in the power spectral domain without using phase information. This method simplifies a process of the case where the plurality of sound sources are present as described above. When both sides of Equation 1 are expressed by power spectrums and a time average $\epsilon$ is calculated, a product of the independent signals can be considered to be zero (for example, $\epsilon\{S_0(\omega)N_1^*(\omega)\}\approx 0$ (where "*" represents a complex conjugate and "$\epsilon$" represents the time average of the signal shown in the curly braces ({ })).

Thus, Equation 1 can be expressed by Equation 5. Here, the power spectrum is processed on a frame-by-frame basis. In the present specification, the time average refers to, for example, an average of the signals (such as the power spectrums) respectively corresponding to the consecutive frames, for each same frequency component.

[Math. 5]

$$\begin{aligned}\varepsilon\{X(\omega)X^*(\omega)\} = \varepsilon\{H_{11}(\omega)H_{11}^*(\omega)S_0(\omega)S_0^*(\omega)\} + \\ \varepsilon\{H_{12}(\omega)H_{12}^*(\omega)N_1(\omega)N_1^*(\omega)\} + \\ \varepsilon\{H_{13}(\omega)H_{13}^*(\omega)N_2(\omega)N_2^*(\omega)\}\end{aligned} \quad \text{Equation 5}$$

In Equation 5, "*" represents a complex conjugate.

Suppose here that: the power spectrum of X(ω) is expressed as $P_x(\omega)$; the power spectrum of the noise $N_1(\omega)$ is expressed as $P_{N1}(\omega)$; and the power spectrum of the noise $N_2(\omega)$ is expressed as $P_{N2}(\omega)$. Here, by assigning $P_x(\omega)$, $P_{N1}(\omega)$, and $P_{N2}(\omega)$ to X(ω), $N_1(\omega)$, and $N_2(\omega)$ in Equation 5, respectively, and also organizing Equation 5 using Equation 4, Equation 6 can be derived as below.

[Math. 6]

$$\epsilon\{P_X(\omega)\}=\epsilon\{P_S(\omega)\}+H_{12}(\omega)H_{12}^*(\omega)\epsilon\{P_{N1}(\omega)\}+H_{13}(\omega)H_{13}^*(\omega)\epsilon\{P_{N2}(\omega)\} \quad \text{Equation 6}$$

Suppose here that the power spectrum of $R_1(\omega)$ in Equation 2 is expressed as $P_{R1}(\omega)$, and that the power spectrum of $R_2(\omega)$ in Equation 3 is expressed as $P_{R2}(\omega)$. In this case, Equation 7 and Equation 8 are derived from Equation 2 and Equation 3, respectively. Then, by substituting Equations 7 and 8 into Equation 6, Equation 6 can be organized. As a result, as shown by Equation 9, a relationship between the desired $P_s(\omega)$ and the observable $P_x(\omega)$, $P_{R1}(\omega)$, and $P_{R2}(\omega)$ can be expressed by a linear equation.

[Math. 7]

$$P_{N1}(\omega) = \frac{1}{H_{22}(\omega)H_{22}^*(\omega)}P_{R1}(\omega) \quad \text{Equation 7}$$

[Math. 8]

$$P_{N2}(\omega) = \frac{1}{H_{33}(\omega)H_{33}^*(\omega)}P_{R2}(\omega) \quad \text{Equation 8}$$

[Math. 9]

$$\varepsilon\{P_X(\omega)\} = \varepsilon\{P_S(\omega)\} + \frac{H_{12}(\omega)H_{12}^*(\omega)}{H_{22}(\omega)H_{22}^*(\omega)}\varepsilon\{P_{R1}(\omega)\} + \frac{H_{13}(\omega)H_{13}^*(\omega)}{H_{33}(\omega)H_{33}^*(\omega)}\varepsilon\{P_{R2}(\omega)\} \quad \text{Equation 9}$$

Parts related to the transfer characteristics in the second and third terms on the right side of Equation 9 are expressed by the weight coefficients $A_2(\omega)$ and $A_3(\omega)$ as shown by Equations 10 and 11. By substituting Equations 10 and 11 into Equation 9, Equation 12 can be derived.

[Math. 10]

$$A_2(\omega) = \frac{H_{12}(\omega)H_{12}^*(\omega)}{H_{22}(\omega)H_{22}^*(\omega)} \quad \text{Equation 10}$$

[Math. 11]

$$A_3(\omega) = \frac{H_{13}(\omega)H_{13}^*(\omega)}{H_{33}(\omega)H_{33}^*(\omega)} \quad \text{Equation 11}$$

[Math. 12]

$$\varepsilon\{P_X(\omega)\} = \varepsilon\{P_S(\omega)\} + A_2(\omega)\varepsilon\{P_{R1}(\omega)\} + A_3(\omega)\varepsilon\{P_{R2}(\omega)\} \quad \text{Equation 12}$$

Accordingly, by calculating the weight coefficients $A_2(\omega)$ and $A_3(\omega)$, the estimated target sound power spectrum signal $P_s(\omega)$ can be obtained based on the power spectrum signals $P_x(\omega)$, $P_{R1}(\omega)$, and $P_{R2}(\omega)$ observable by the multi-input noise suppression device.

Here, in Equation 12, each level of the power spectrums $P_x(\omega)$, $P_{R1}(\omega)$, $P_{R2}(\omega)$, and $P_s(\omega)$ varies with the frames corresponding to the unit clock times T1, T2, . . . , and Tn. In contrast, the weight coefficients $A_2(\omega)$ and $A_3(\omega)$ relate only to the transfer characteristics. On this account, the weight coefficients $A_2(\omega)$ and $A_3(\omega)$ are constant unless the transfer characteristics vary.

Therefore, even when the power spectrums $P_x(\omega)$, $P_{R1}(\omega)$, $P_{R2}(\omega)$, and $P_s(\omega)$ vary with the frames corresponding to the unit clock times T1, T2, . . . , and Tn, there are the weight coefficients $A_2(\omega)$ and $A_3(\omega)$ formulating the linear equation of Equation 12.

The weight coefficients $A_2(\omega)$ and $A_3(\omega)$ are obtained by applying an adaptive equalization algorithm to equalize the linear equation on the right side of Equation 12 with $P_x(\omega)$ on the left side of Equation 12. With this method, the values of the power spectrums $P_x(\omega)$, $P_{R1}(\omega)$, $P_{R2}(\omega)$, and $P_s(\omega)$ in the frames corresponding to the unit clock times T1, T2, . . . , and Tn can always be used for calculating the weight coefficients $A_2(\omega)$ and $A_3(\omega)$. Accordingly, in Embodiment 1, it is not necessary to detect a time frame including only the target sound or only the noise to estimate the target sound.

Here, the unit clock times T1, T2, . . . , and Tn correspond to the aforementioned frame clock times. In the case of acoustic processing for an audibility range of 20 Hz to 20 kHz, the frame length and the frame shift length are of the order of several milliseconds to several hundred milliseconds. Moreover, when a different signal, such as an ultrasound signal or a low frequency signal, is to be used, the frame length and the frame shift length vary in proportion to the frequency band to be processed.

Examples of the adaptive equalization algorithm applied to Equation 12 include a least mean square (LMS) method. The following describes a method of obtaining the weight coefficients $A_2(\omega)$ and $A_3(\omega)$ according to this LMS method.

In general, the LMS method is used for estimating a transfer characteristic to be convoluted into a signal. On this account, an input signal is a temporal waveform, and a coefficient to be estimated is an impulse response of the transfer characteristic. In Embodiment 1, the LMS method is used for calculating a ratio of frequency component power between a plurality of channels.

Therefore, the input signal is not a temporal waveform, and thus is a frequency component spectrum for each of the channels. Moreover, the coefficients to be estimated are the weight coefficients $A_2(\omega)$ and $A_3(\omega)$. In Embodiment 1, each of the input signal and the weight coefficients $A_2(\omega)$ and $A_3(\omega)$ used by the LMS method takes on a nonnegative value. Here, the input signal and the weight coefficients used in Embodiment 1 are different from the input signal and the estimated coefficient in the normal application of the LMS method, in that the input signal and the weight coefficients in Embodiment 1 take on nonnegative values.

In order to obtain a solution according to the LMS method, the estimated error power spectrum $P_{err}(\omega)$ is calculated using Equation 13 and then the coefficients are updated using Equation 14. Here, Equation 13 and Equation 14 are examples where a normalized least mean square (NLMS) algorithm in particular is applied as the LMS method.

As a result of updating the weight coefficient $A_1(\omega)$ in Equations 13 and 14 by learning, the estimated target sound power spectrum $P_s(\omega)$ becomes equal to the target sound power spectrum included in the input signal power spectrum $P_x(\omega)$. On this account, the weight coefficient $A_1(\omega)$ may be set in advance as a fixed coefficient, such as "the weight coefficient $A_1(\omega)=1$".

[Math. 13]

$$P_{err}(\omega) = \varepsilon\{P_X(\omega)\} - (A_1(\omega)\varepsilon\{P_S(\omega)\} + A_2(\omega)\varepsilon\{P_{R1}(\omega)\} + A_3(\omega)\varepsilon\{P_{R2}(\omega)\}) \quad \text{Equation 13}$$

[Math. 14]

$$\begin{bmatrix} A_1(\omega) \\ A_2(\omega) \\ A_3(\omega) \end{bmatrix}_{n+1} = \begin{bmatrix} A_1(\omega) \\ A_2(\omega) \\ A_3(\omega) \end{bmatrix}_n + \frac{\alpha \cdot P_{err}(\omega)}{\varepsilon\{P_S(\omega)\}^2 + \varepsilon\{P_{R1}(\omega)\}^2 + \varepsilon\{P_{R2}(\omega)\}^2} \begin{bmatrix} \varepsilon\{P_S(\omega)\} \\ \varepsilon\{P_{R1}(\omega)\} \\ \varepsilon\{P_{R2}(\omega)\} \end{bmatrix} \quad \text{Equation 14}$$

In Equation 14, the term assigned with "n" indicate the current weight coefficients $A_1(\omega)$, $A_2(\omega)$, and $A_3(\omega)$. Moreover, the term assigned with "n+1" indicates the updated weight coefficients $A_1(\omega)$, $A_2(\omega)$, and $A_3(\omega)$.

[Math. 15]

$$P_1(\omega)=P_X(\omega) \quad \text{Equation 15}$$

[Math. 16]

$$P_2(\omega)=P_{R1}(\omega) \quad \text{Equation 16}$$

[Math. 17]

$$P_3(\omega)=P_{R2}(\omega) \quad \text{Equation 17}$$

Figure 4:
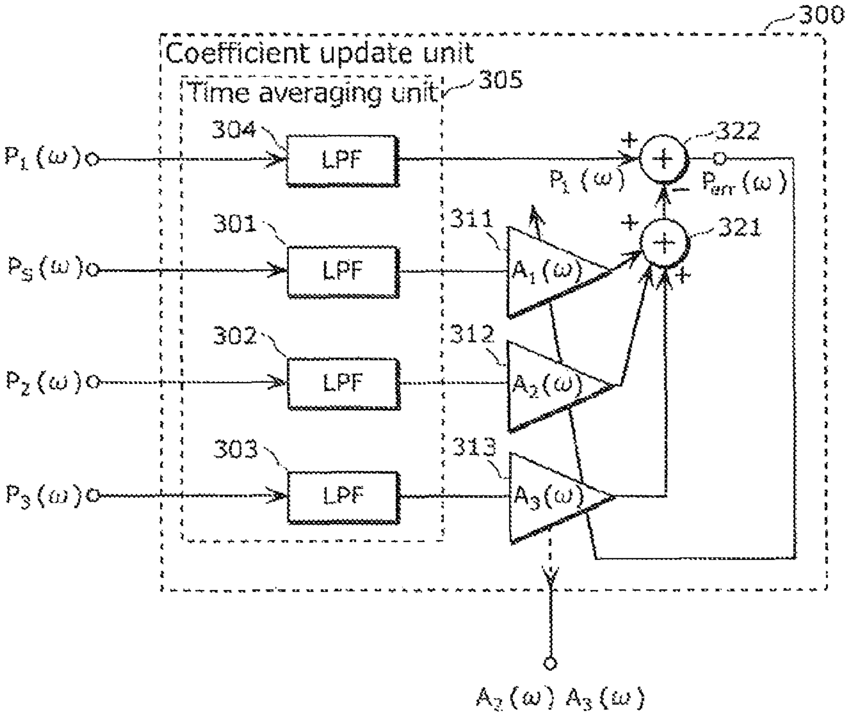
[FIG. 4]

FIG. 4 is a block diagram showing an example of a configuration of the coefficient update unit 300 in Embodiment 1.

The coefficient update unit 300 includes a time averaging unit 305. Although described in detail later, the time averaging unit 305 calculates each time average of the main power spectrum, the reference power spectrum, and the estimated target sound power spectrum in the plurality of frames.

The time averaging unit 305 includes LPF units 301, 302, 303, and 304. Here, $P_s(\omega)$, $P_2(\omega)$, $P_3(\omega)$, and $P_1(\omega)$ are inputted into the LPF units 301, 302, 303, and 304, respectively.

With the configuration shown in FIG. 4, the coefficient update unit 300 can update the weight coefficients $A_1(\omega)$, $A_2(\omega)$, and $A_3(\omega)$ using equations derived by substituting Equation 15 to Equation 17 into Equations 13 and 14. In the following, the equation derived by substituting Equation 15 into Equation 13 may also be referred to as Equation 13A. Moreover, in the following, the equation derived by substituting Equations 16 and 17 into Equation 14 may also be referred to as Equation 14A.

In each of Equations 13 and 14, "$\epsilon$" represents the time average of the signal shown in the curly braces ({ }). The LPF unit 301 outputs "$\epsilon\{P_s(\omega)\}$" to the multiplication unit 311. The LPF unit 302 outputs "$\epsilon\{P_2(\omega)\}$" to the multiplication unit 312. The LPF unit 303 outputs "$\epsilon\{P_3(\omega)\}$" to the multiplication unit 313. The LPF unit 304 outputs "$\epsilon\{P_1(\omega)\}$" to the subtraction unit 322. Here, $\epsilon\{P_s(\omega)\}$, $\epsilon\{P_2(\omega)\}$, $\epsilon\{P_3(\omega)\}$, and $\epsilon\{P_1(\omega)\}$ represent the time averages of $P_s(\omega)$, $P_2(\omega)$, $P_3(\omega)$, and $P_1(\omega)$, respectively.

Each of the LPF units 301 to 304 has a function of calculating the time average of the plurality of input signals corresponding to the plurality of frames.

The LPF unit 301 calculates the time average $\epsilon\{P_s(\omega)\}$ of the plurality of $P_s(\omega)$ corresponding to the plurality of frames. The LPF unit 302 calculates the time average $\epsilon\{P_2(\omega)\}$ of the plurality of $P_2(\omega)$ (i.e., the reference power spectrums) corresponding to the plurality of frames. As with the LPF 302, the LPF unit 303 also calculates $\epsilon\{P_3(\omega)\}$. The LPF unit 304 calculates the time average $\epsilon\{P_1(\omega)\}$ of the plurality of $P_1(\omega)$ (i.e., the main power spectrums) corresponding to the plurality of frames.

The coefficient update unit 300 updates the weight coefficients $A_1(\omega)$; $A_2(\omega)$, and $A_3(\omega)$ to be used by the multiplication units 311 to 313, by assigning, to Equations 13A and 14A, the calculated time averages of the input signals and the estimated error power spectrum $P_{err}(\omega)$ outputted from the subtraction unit 322.

Here, each of the signals inputted into the coefficient update unit 300 and each of the weight coefficients $A_1(\omega)$, $A_2(\omega)$, and $A_3(\omega)$ takes on a nonnegative value. Therefore, the weight coefficients $A_1(\omega)$, $A_2(\omega)$, and $A_3(\omega)$ converge (are updated) so that the estimated error power spectrum $P_{err}(\omega)$ approximates to zero.

When the weight coefficients $A_1(\omega)$, $A_2(\omega)$, and $A_3(\omega)$ are too great in Equation 13, the value of $P_{err}(\omega)$ becomes negative. The variables other than $P_{err}(\omega)$ are nonnegative values in Equation 14 and, therefore, the weight coefficients $A_1(\omega)$, $A_2(\omega)$, and $A_3(\omega)$ are updated to be smaller.

On the other hand, when the weight coefficients $A_1(\omega)$, $A_2(\omega)$, and $A_3(\omega)$ are too small, the value of $P_{err}(\omega)$ becomes positive. Thus, the weight coefficients $A_1(\omega)$, $A_2(\omega)$, and $A_3(\omega)$ are updated to be greater. While $P_{err}(\omega)$ oscillates between positive and negative, the ratio of the weight coefficients $A_1(\omega)$, $A_2(\omega)$, and $A_3(\omega)$ is obtained.

When the channels (signals) are higher in the input level, the weight coefficients $A_1(\omega)$, $A_2(\omega)$, and $A_3(\omega)$ contribute more to the value of $P_{err}(\omega)$. Therefore, the amount of update based on $P_{err}(\omega)$ is greater in the case of the weight coefficient corresponding to the channel (signal) higher in the input level.

Moreover, a step-size parameter $\alpha$ in Equation 14 controls a convergence speed that is set so that the weight coefficients gradually approximate to the convergence values by multiple updates. In Embodiment 1, $\alpha$ is set to be within a range of $0<\alpha<1$. Using this parameter $\alpha$, an effect of smooth processing (that is, an effect of temporally averaging) can be achieved as well.

Moreover, each of the frequency analysis units 110, 120, and 130 uses a signal having a certain time length, for frequency analysis. Thus, an effect of short-term averaging can be achieved. On this account, the weight coefficients $A_1(\omega)$, $A_2(\omega)$, and $A_3(\omega)$ may be updated using Equations 18 and 19 in Embodiment 1.

Equation 18 is obtained by omitting "$\epsilon\{\ \}$" included in Equation 13. Equation 19 is obtained by omitting "$\epsilon\{\ \}$" included in Equation 14.

[Math. 18]

$$P_{err}(\omega) = P_X(\omega) - (A_1(\omega)P_S(\omega) + A_2(\omega)P_{R1}(\omega) + A_3(\omega)P_{R2}(\omega)) \quad \text{Equation 18}$$

[Math. 19]

$$\begin{bmatrix} A_1(\omega) \\ A_2(\omega) \\ A_3(\omega) \end{bmatrix}_{n+1} = \begin{bmatrix} A_1(\omega) \\ A_2(\omega) \\ A_3(\omega) \end{bmatrix}_{n} + \frac{\alpha \cdot P_{err}(\omega)}{P_S(\omega)^2 + P_{R1}(\omega)^2 + P_{R2}(\omega)^2} \begin{bmatrix} P_S(\omega) \\ P_{R1}(\omega) \\ P_{R2}(\omega) \end{bmatrix} \quad \text{Equation 19}$$

Figure 5:
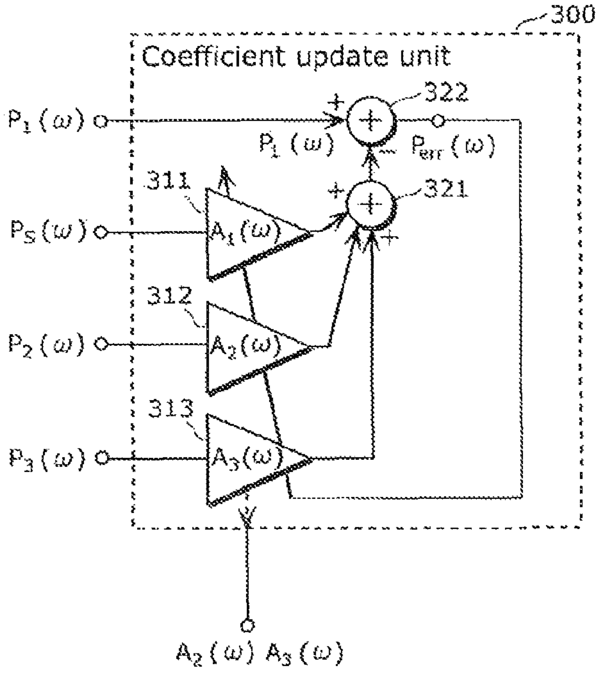
[FIG. 5]

Thus, the coefficient update unit 300 that updates the weight coefficients $A_1(\omega)$, $A_2(\omega)$, and $A_3(\omega)$ using Equations 18 and 19 may have a configuration shown as an example in FIG. 5.

To be more specific, the coefficient update unit 300 may not include the time averaging unit 305.

Next, the method of deriving the target sound power spectrum, that is, the method of obtaining the estimated target sound power spectrum $P_s(\omega)$ is described. The estimated target sound power spectrum $P_s(\omega)$ is a signal desired as an output from the multi-input noise suppression device 1000. In order to obtain the weight coefficients $A_1(\omega)$, $A_2(\omega)$, and $A_3(\omega)$ using Equations 13 and 14, the estimated target sound power spectrum $P_s(\omega)$ needs to be obtained (calculated) in advance.

However, when the estimated target sound power spectrum $P_s(\omega)$ is calculated using Equation 20 assuming that $P_{err}(\omega)=0$ and the weight coefficient $A_1(\omega)=1$, $P_{err}(\omega)$ is always zero in Equation 13. This means that the coefficients cannot be updated using Equation 14. Here, the weight coefficient $A_1(\omega)$ is assumed to be 1 because the weight coefficient $A_1(\omega)$ eventually converges approximately to 1. Equation 20 is based on a spectral subtraction method.

[Math. 20]

$$P_s(\omega)=P_X(\omega)-(A_2(\omega)P_{R1}(\omega)+A_3(\omega)P_{R2}(\omega)) \quad \text{Equation 20}$$

Thus, the estimated target sound power spectrum $P_s(\omega)$ needs to be obtained according to a method derived from a standard different from that of Equation 20. Moreover, it is preferable to estimate according to a method that increases the noise suppression effect more than the case using Equation 20.

The configuration of the power spectrum estimation unit 200 is not limited to the configuration shown in FIG. 2. The power spectrum estimation unit 200 may have a configuration shown in FIG. 6.

Figure 6:
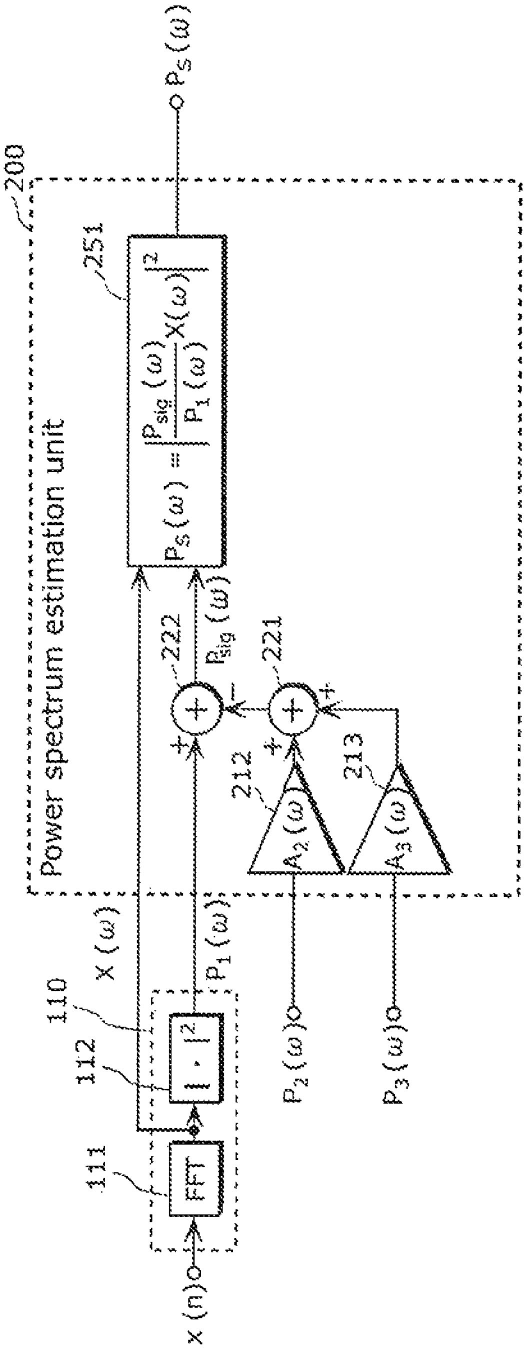
[FIG. 6]

FIG. 6 is a block diagram showing an example of the configuration where the power spectrum estimation unit 200 includes a filter calculation unit 251. The following describes an example of deriving the estimated target sound power spectrum $P_s(\omega)$ according to a method using the Wiener filter as a noise suppressor, with reference to FIG. 6. The multiplication units 212 and 213, the addition unit 221, and the subtraction unit 222 have been described above with reference to FIG. 2 and, therefore, the explanations are not repeated here.

The filter calculation unit 251 has a filter characteristic $H_w(\omega)$ of the Wiener filter as the noise suppressor, as expressed by Equation 21. It should be noted that $P_{sig}(\omega)$ is obtained by calculating the right side of Equation 20.

[Math. 21]

$$Hw(\omega) = \frac{P_{sig}(\omega)}{P_X(\omega)} \quad \text{Equation 21}$$

The power spectrum estimation unit 200 (the filter calculation unit 250) obtains (calculates) the estimated target sound power spectrum $P_s(\omega)$, by multiplying the spectrum $X(\omega)$ of the main signal $x(n)$ by the filter characteristic $H_w(\omega)$ using Equations 21 and 22 and then squaring the multiplication result. Here, the spectrum $X(\omega)$ is outputted from the FFT calculation unit 111.

[Math. 22]

$$P_S(\omega) = \left| \frac{P_{sig}(\omega)}{P_X(\omega)} \cdot X(\omega) \right|^2 \quad \text{Equation 22}$$

Moreover, by organizing Equation 22, Equation 23 is derived. The power spectrum estimation unit 200 shown in FIG. 2 calculates the estimated target sound power spectrum $P_s(\omega)$ using Equation 23.

[Math. 23]

$$P_S(\omega) = \frac{P_{sig}(\omega)^2}{P_X(\omega)} \quad \text{Equation 23}$$

The power spectrum estimation unit 200 (the filter calculation unit 250) shown in FIG. 2 can calculate, by using Equation 23, the estimated target sound power spectrum $P_s(\omega)$ in the same way as the power spectrum estimation unit 200 shown in FIG. 6 that uses Equation 22. Moreover, the power spectrum estimation unit 200 shown in FIG. 2 can reduce the amount of calculation.

Equation 23 is dependent on the power spectrum $P_{sig}(\omega)$ that is a difference between the power spectrum $P_1(\omega)$ and a first power spectrum. To be more specific, the filter calculation unit 250 shown in FIG. 2 has a filter characteristic dependent on the difference (the power spectrum $P_{sig}(\omega)$) between the main power spectrum and the first calculated value (the output from the addition unit 221).

The calculation of the estimated target sound power spectrum $P_s(\omega)$ by the filter calculation unit 250 using Equation 23 corresponds to the calculation of the estimated target sound power spectrum $P_s(\omega)$ by the filter calculation unit 250 by filtering the main power spectrum using the aforementioned filter characteristic.

Equations 22 and 23 are obtained based on the Wiener filter method. Thus, unlike Equation 20 based on the spectral subtraction method, $P_{err}(\omega)$ is never always zero in Equation 13. This means that the weight coefficients can be updated using Equation 13.

Next, a process performed by the multi-input noise suppression device 1000 in Embodiment 1 is described (this process may also be referred to as the noise suppression process hereafter). The noise suppression process is performed on a frame-by-frame basis. As an example, a frame period is 100 milliseconds in Embodiment 1. It should be noted that the frame period is not limited to 100 milliseconds and may be within a range from several milliseconds to several hundred milliseconds.

The noise suppression process is repeated multiple times. One noise suppression process is performed over the frame period. The process where the noise suppression process is repeated multiple times corresponds to the multi-input noise suppression method in Embodiment 1.

Figure 7:
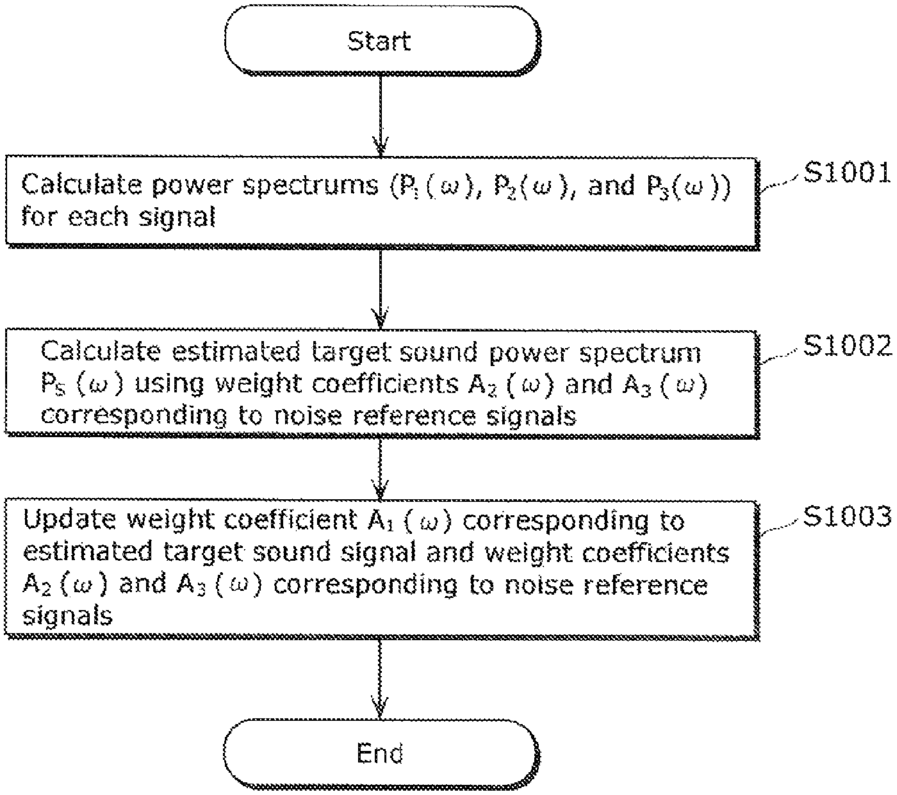
[FIG. 7]

FIG. 7 is a flowchart showing the noise suppression process. Suppose here that the noise suppression process is started at a frame clock time T(k+1) (where "k" is an integer equal to or greater than 1).

Firstly, in step S1001, the power spectrum calculation unit 100 performs a calculation process to obtain, after each expiration of the unit clock time (the frame clock time): a main power spectrum that is as a power spectrum of a main signal; and a reference power spectrum that is a power spectrum of a noise reference signal.

To be more specific, the power spectrum calculation unit 100 performs frequency analysis, in the frame period, on the main signal x(n) and the noise reference signals $r_1(n)$ and $r_2(n)$ inputted at the frame clock time T(k+1). As a result of the frequency analysis, the power spectrum calculation unit 100 obtains the power spectrums $P_1(\omega)$, $P_2(\omega)$, and $P_3(\omega)$. Then, the power spectrum calculation unit 100 outputs the obtained power spectrums $P_1(\omega)$, $P_2(\omega)$, and $P_3(\omega)$. Each of the processes performed by the frequency analysis units 110, 120, and 130 of the power spectrum calculation unit 100 has been described above and, therefore, the detailed explanation is not repeated here.

More specifically, the power spectrum calculation unit 100 calculates, after each expiration of the unit clock time (the frame clock time), the main power spectrum and the reference power spectrum on a frame-by-frame basis.

Next, in step S1002, every time the calculation process is performed, the power spectrum estimation unit 200 performs an estimation process to obtain an estimated target sound power spectrum that is assumed to be a power spectrum of the target sound, based on the main power spectrum and on a first calculated value obtained by at least multiplying the reference power spectrum by a first weight coefficient. The details are described later.

To be more specific, the power spectrum estimation unit 200 obtains (calculates) the estimated target power spectrum $P_s(\omega)$ using: the power spectrums $P_1(\omega)$, $P_2(\omega)$, and $P_3(\omega)$ outputted from the power spectrum calculation unit 100 in the frame period corresponding to the frame clock time T(k+1); and the weight coefficients $A_2(\omega)$ and $A_3(\omega)$ calculated by the coefficient update unit 300 in the frame period corresponding to the frame clock time Tk.

More specifically, the power spectrum estimation unit 200 obtains the estimated target sound power spectrum on a frame-by-frame basis, after each expiration of the unit clock time.

In the case where step S1002 is performed for the first time, the power spectrum estimation unit 200 uses any weight coefficients $A_2(\omega)$ and $A_3(\omega)$ as initial values. The weight coefficients $A_2(\omega)$ and $A_3(\omega)$ as the initial values may be determined by a simulation or the like so as to be used for calculating the estimated target power spectrum $P_s(\omega)$ closer to the power spectrum of the target sound.

To be more specific, the power spectrum estimation unit 200 obtains, in the estimation process, the estimated target power spectrum. $P_s(\omega)$, by at least multiplying the reference power spectrum calculated upon the expiration of the k+1$^{th}$ unit clock time Tk by the first weight coefficient updated by the coefficient update unit 300 upon the expiration of the k$^{th}$ unit clock time Tk. Then, the power spectrum estimation unit 200 outputs the estimated target sound power spectrum $P_s(\omega)$. The first weight coefficient is $A_2(\omega)$, for example. The reference power spectrum is the power spectrum $P_2(\omega)$, for example.

The following is a detailed description. Firstly, the multiplication unit 212 multiplies the power spectrum $P_2(\omega)$ by the weight coefficient $A_2(\omega)$ for each of the frequency components to weight the power spectrum $P_2(\omega)$. Then, the multiplication unit 212 outputs the weighted power spectrum.

Moreover, the multiplication unit 213 multiplies the power spectrum $P_3(\omega)$ by the weight coefficient $A_3(\omega)$ for each of the frequency components to weight the power spectrum $P_3(\omega)$. Then, the multiplication unit 213 outputs the weighted power spectrum.

The addition unit 221 adds the two power spectrums outputted from the multiplication units 212 and 213, respectively, for each of the frequency components. Then, the addition unit 221 outputs the first power spectrum obtained as a result of the addition.

The subtraction unit 222 subtracts the first power spectrum from the power spectrum $P_1(\omega)$ for each of the frequency components. Then, the subtraction unit 222 outputs, as the power spectrum $P_{sig}(\omega)$, the second power spectrum obtained as a result of the subtraction. More specifically, the subtraction unit 222 of the power spectrum estimation unit 200 subtracts the first calculated value from the main power spectrum. The first calculated value is the first power spectrum outputted from the addition unit 221.

The filter calculation unit 250 calculates the estimated target sound power spectrum $P_s(\omega)$ using the power spectrum $P_1(\omega)$ and the power spectrum $P_{sig}(\omega)$, according to Equation 15 and Equation 23 that is based on the Wiener filter method. To be more specific, the filter calculation unit 250 obtains the estimated target sound power spectrum $P_s(\omega)$, by filtering the main power spectrum ($P_1(\omega)$) using the filter characteristic dependent on the power spectrum $P_{sig}(\omega)$.

More specifically, the power spectrum estimation unit 200 at least subtracts the first calculated value from the main power spectrum to obtain the estimated target sound power spectrum $P_s(\omega)$, that is different from a result obtained by simply subtracting the first calculated value from the main power spectrum.

Then, the filter calculation unit 250 outputs the estimated target sound power spectrum $P_s(\omega)$.

Next, in step S1003, the coefficient update unit 300 shown in FIG. 5 updates the weight coefficients $A_1(\omega)$, $A_2(\omega)$, and $A_3(\omega)$ using: the power spectrums $P_1(\omega)$, $P_2(\omega)$, and $P_3(\omega)$ outputted from the power spectrum calculation unit 100; and the estimated target sound power spectrum $P_s(\omega)$ outputted from the filter calculation unit 250.

To be more specific, every time the estimation process is performed, the coefficient update unit 300 updates the first weight coefficient and the second weight coefficient so that the second calculated value approximates to the main power spectrum. The second calculated value is obtained by adding at least two values obtained by multiplying the reference power spectrum and the estimated target sound power spectrum by the first weight coefficient and the second weight coefficient, respectively. The second weight coefficient is $A_1(\omega)$. The second calculated value is the power spectrum outputted from the addition unit 321.

In other words, the coefficient update unit 300 updates the first weight coefficient and the second weight coefficient according to the LMS method so that a difference between the main power spectrum and the second calculated value approximates to zero.

Moreover, to be more specific, the multiplication unit 311 multiplies the estimated target sound power spectrum $P_s(\omega)$ by the weight coefficient $A_1(\omega)$ for each of the frequency components to weight the estimated target sound power spectrum $P_s(\omega)$. Then, the multiplication unit 311 outputs the weighted power spectrum.

The multiplication unit 312 multiplies the power spectrum $P_2(\omega)$ by the weight coefficient $A_2(\omega)$ for each of the frequency components to weight the power spectrum $P_2(\omega)$. Then, the multiplication unit 312 outputs the weighted power spectrum.

The multiplication unit 313 multiplies the power spectrum $P_3(\omega)$ by the weight coefficient $A_3(\omega)$ for each of the frequency components to weight the power spectrum $P_3(\omega)$. Then, the multiplication unit 313 outputs the weighted power spectrum.

The addition unit 321 adds the three weighted power spectrums outputted from the multiplication units 311, 312 and 313, respectively, for each of the frequency components. Then, the addition unit 321 outputs the power spectrum obtained as a result of the addition (this result may also be referred to as the summed power spectrum hereafter).

The subtraction unit 322 subtracts, from the power spectrum $P_1(\omega)$, the summed power spectrum outputted from the addition unit 321, for each of the frequency components. Then, the subtraction unit 322 outputs the power spectrum obtained as a result of the subtraction, as the estimated error power spectrum $P_{err}(\omega)$.

The coefficient update unit 300 updates (calculates) the weight coefficients $A_1(\omega)$, $A_2(\omega)$, and $A_3(\omega)$ using Equations 18 and 19 and Equations 15 to 17. Then, the coefficient update unit 300 outputs, to the power spectrum estimation unit 200, the updated weight coefficients $A_1(\omega)$, $A_2(\omega)$, and $A_3(\omega)$ as the coefficients to be used by the power spectrum estimation unit 200 in the frame period corresponding to the frame clock time T(k+2).

The noise suppression process described thus far is performed multiple times after each expiration of the unit clock time (the frame clock time). As a result, the weight coefficients $A_1(\omega)$, $A_2(\omega)$, and $A_3(\omega)$ are updated so that the summed power spectrum outputted from the addition unit 321 approximates to the main power spectrum of the main signal x(n). More specifically, after each expiration of the unit time, each of the first weight coefficient and the second weight coefficient converges to a value accurately indicating the amount of target sound component and the amount of noise component included in the main signal. The first weight coefficient is the weight coefficient $A_2(\omega)$ or $A_3(\omega)$. The second weight coefficient is the weight coefficient $A_1(\omega)$.

Accordingly, since the first weight coefficient converging to the value accurately indicating the amount of target sound component and the amount of noise component is used, the obtained estimated target sound power spectrum exceedingly approximates to the power spectrum of the target sound. Therefore, the sound signal (i.e., the estimated target sound power spectrum) where the noise component is suppressed with high accuracy can be obtained (estimated). As a result, the noise component can be suppressed with high accuracy.

It should be noted that, in step S1003, the coefficient update unit 300 having the configuration shown in FIG. 4 may perform the process. In this case, the coefficient update unit 300 updates (calculates) the weight coefficients $A_1(\omega)$, $A_2(\omega)$, and $A_3(\omega)$ using Equation 13 to 17 as described above.

In this case, the coefficient update unit 300 shown in FIG. 4 updates the first weight coefficient and the second weight coefficient so that the time average of the main power spectrum calculated by the time averaging unit 305 approximates to the value dependent on the sum of the time average of the reference power spectrum and the time average of the estimated target sound power spectrum.

Figure 8:
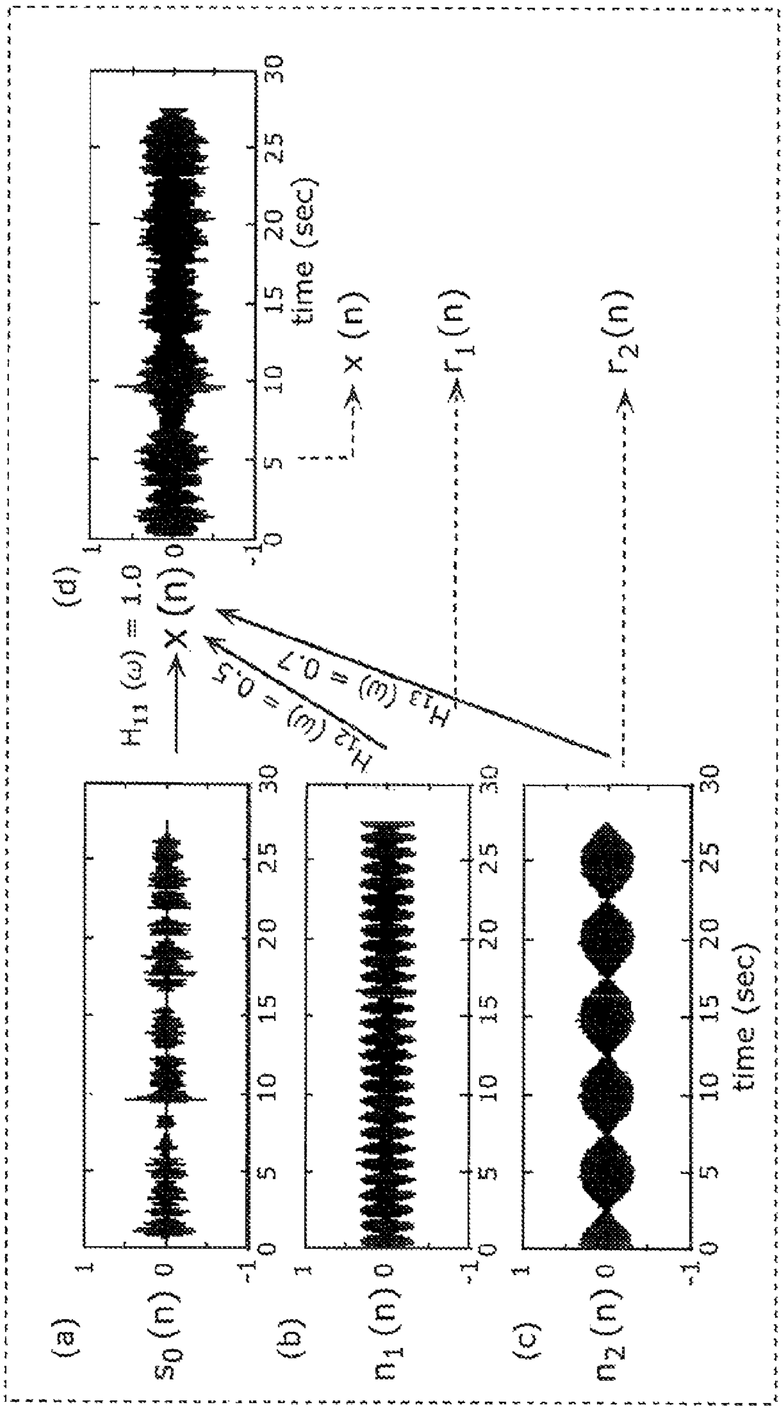
[FIG. 8]
Figure 9:
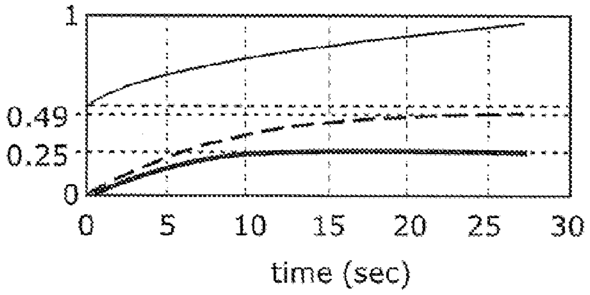
[FIG. 9]

Next, a result of simulation performed by the multi-input noise suppression device 1000 in Embodiment 1 is described, with reference to FIG. 8 and FIG. 9.

FIG. 8 is a diagram showing examples of signals to be inputted into the multi-input noise suppression device 1000 in Embodiment 1. Here, FIG. 8 shows waveforms of the signals shown in FIG. 3.

In FIG. 8, (a) shows a target sound $s_0(\omega)$ indicating the target sound $S_0(\omega)$ in the time domain and (b) shows a noise $n_1(n)$ indicating the noise $N_1(\omega)$ in the time domain. The noise $n_1(n)$ corresponds to the noise reference signal $r_1(n)$.

In FIG. 8, (c) shows a noise $n_2(n)$ indicating the noise $N_2(\omega)$ in the time domain. The noise $n_2(n)$ corresponds to the noise reference signal $r_2(n)$. In FIG. 8, (d) shows the main signal x(n).

In order to simulate a state where a noise is mixed into the target sound $s_0(\omega)$, the main signal x(n) is formed by Equation 24, as an example.

[Math. 24]

$$x(n)=s_0(n)+0.5\times n_1(n)+0.7\times n_2(n) \quad \text{Equation 24}$$

Equation 24 is expressed by an instantaneous mixture model for the sake of simplification. Equation 24 corresponds to an equation obtained by assuming that $H_{11}(\omega)=1.0$, $H_{12}(\omega)=0.5$, and $H_{13}(\omega)=0.7$ hold for each frequency component $\omega$ in Equation 1.

In an actual environment, an equation indicating the main signal is a convolutional mixture model where transfer characteristics are convoluted. However, in the process performed in Embodiment 1, the signals are converted into power spectrums by the frequency analysis units 110, 120, and 130.

Thus, convolution in the time domain is converted into multiplication in the frequency domain. To be more specific, behavior for each of the frequency components can be processed as instantaneous mixture. On this account, the operation performed by the multi-input noise suppression device 1000 can be verified according to Equation 24.

Moreover, the noise reference signal $r_1(n)$ and the noise reference signal $r_2(n)$ are obtained from Equations 2 and 3 in the case where $H_{22}(\omega)=1.0$ and $H_{33}(\omega)=1.0$ are assumed to hold for each frequency component $\omega$.

FIG. 9 is a diagram showing an update state of the weight coefficients $A_1(\omega)$, $A_2(\omega)$, and $A_3(\omega)$ corresponding to the signals shown in FIG. 8. The horizontal axis represents the time and the vertical axis represents the weight coefficient value. The weight coefficient value shown here is an average value obtained for each frequency component ω.

FIG. 9 shows variations of the weight coefficients $A_1(\omega)$, $A_2(\omega)$, and $A_3(\omega)$ in the case where the main signal x(n) and the noise reference signals $r_1(n)$ and $r_2(n)$ having the waveforms as shown in FIG. 8 are signals inputted into the multi-input noise suppression device 1000.

In FIG. 9, a thick line indicates variation of the weight coefficient $A_2(\omega)$ and a dashed line indicates variation of the weight coefficient $A_3(\omega)$. The uppermost line in FIG. 9 indicates variation of the weight coefficient $A_1(\omega)$.

As can be seen from FIG. 9: the weight coefficient $A_1(\omega)$ converges approximately to 1.0; the weight coefficient $A_2(\omega)$ converges approximately to 0.25; and the weight coefficient $A_3(\omega)$ converges approximately to 0.49. The weight coefficients $A_1(\omega)$, $A_2(\omega)$, and $A_3(\omega)$ are coefficients by which the power spectrums are to be multiplied. Therefore, each of the weight coefficients converges to the square of an amplitude level of the corresponding transfer characteristic.

More specifically: the weight coefficient $A_1(\omega)$ converges to the square of an absolute value of $H_{11}(\omega)$; the weight coefficient $A_2(\omega)$ converges to the square of an absolute value of $H_{12}(\omega)$; and the weight coefficient $A_3(\omega)$ converges to the square of an absolute value of $H_{13}(\omega)$.

Here is a summary of the input signals and conditions used in Equation 24.

[Condition 1] "$s_0(n)$" indicates a speech waveform signal.

[Condition 2] "$n_1(n)$" is equivalent to "Wn1(n)×sin(2×π×0.5×n/fs)". "$n_1(n)$" indicates a broadband noise signal that varies in amplitude every one second.

[Condition 3] "$n_2(n)$" is equivalent to "Wn2(n)×cos(2×π×0.1×n/fs)". "$n_2(n)$" indicates a broadband noise signal that varies in amplitude every five second.

[Condition 4] "Wn1(n)" and "Wn2(n)" are white noises independent of each other.

[Condition 5] "fs"=44100 Hz, the step-size parameter a in Equation 14 is 0.005, and the FFT length (the frame size) is 1024.

As described, according to the multi-input noise suppression device 1000 and the multi-input noise suppression method in Embodiment 1, each of the first weight coefficient and the second weight coefficient converges to a value accurately indicating the amount of target sound component and the amount of noise component included in the main signal, after each expiration of the unit clock time. The first weight coefficient is the weight coefficient $A_2(\omega)$ or $A_3(\omega)$. The second weight coefficient is the weight coefficient $A_1(\omega)$.

Accordingly, since the first weight coefficient converging to the value accurately indicating the amount of target sound component and the amount of noise component is used, the obtained estimated target sound power spectrum exceedingly approximates to the power spectrum of the target sound. That is, the estimated target sound power spectrum exceedingly close to the power spectrum of the target sound can be obtained from the main signal including the target sound component and the noise component. Therefore, the sound signal (i.e., the estimated target sound power spectrum) where the noise component is suppressed with high accuracy can be obtained (estimated). As a result, the noise component can be suppressed with high accuracy.

Moreover, according to the conventional technique A described above, it is necessary to detect occurrence states of the target sound component and the noise component. Therefore, the processing is complex to suppress the noise component with high accuracy.

On the other hand, the multi-input noise suppression device 1000 in Embodiment 1 calculates the estimated target sound power spectrum on the basis of the main power spectrum of the main signal and the calculated value obtained from the power spectrums of the noise reference signals. To be more specific, the multi-input noise suppression device 1000 in Embodiment 1 obtains the estimated target sound power spectrum using a linear sum (a linear combination relationship) of the main power spectrum and the power spectrum of the noise reference signal.

Thus, the multi-input noise suppression device 1000 does not need to detect occurrence states of the target sound component and the noise component. More specifically, the multi-input noise suppression device in Embodiment 1 can obtain (estimate), by the simple process, the sound signal (i.e., the estimated target sound power spectrum) where a noise component is suppressed with high accuracy.

Moreover, in the case where a plurality of sound sources are present at the same time, the multi-input noise suppression device 1000 in Embodiment 1 can estimate weight coefficients. More specifically, when a target sound and a noise are present at the same time, accurate weight coefficients can be estimated. Thus, the estimated target sound power spectrum where the noise component is suppressed can be obtained. Furthermore, the multi-input noise suppression device 1000 in Embodiment 1 is capable of learning at all times. This increases the capability to follow the variations in the transfer characteristics and also increases the estimation accuracy, thereby improving the sound quality and the amount of noise suppression.

Even in the case where multiple channels of noise reference signals are present, learning is performed so that suppression weights are appropriately distributed between the channels. Thus, without an increase in process complexity, a stable operation of the multi-input noise suppression device can be ensured.

Figure 10:
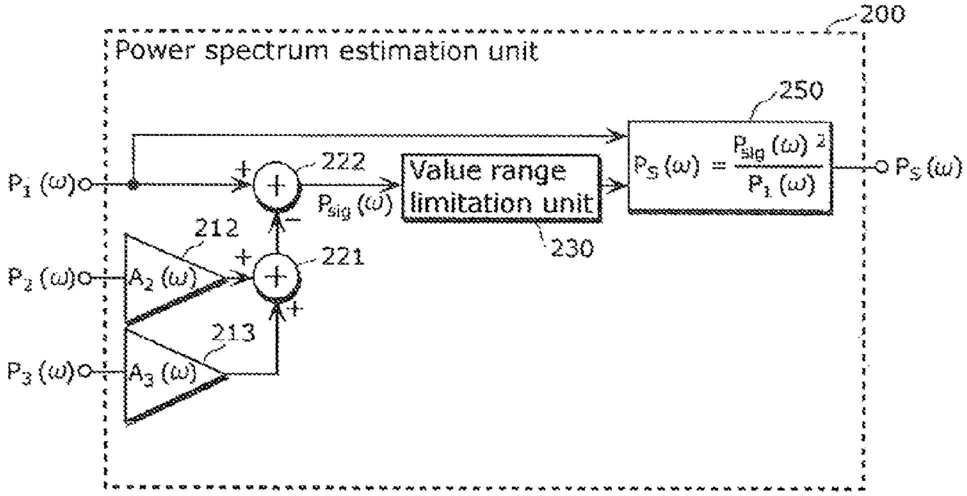
[FIG. 10]

It should be noted that the power spectrum estimation unit 200 shown in FIG. 2 may have a configuration shown in FIG. 10. A power spectrum estimation unit 200 shown in FIG. 10 is different from the power spectrum estimation unit 200 shown in FIG. 2 in that a value range limitation unit 230 is provided between the subtraction unit 222 and the filter calculation unit 250.

The power spectrum $P_{sig}(\omega)$ (i.e., the second power spectrum) outputted from the subtraction unit 222 has to take on a nonnegative value. However, it may be possible for the power spectrum $P_{sig}(\omega)$ to take on a negative value during the learning process or due to an error. On this account, the value range limitation unit 230 establishes a limit so that the power spectrum $P_{sig}(\omega)$ (i.e., the second power spectrum) does not take on a negative value. To be more specific, when $P_{sig}(\omega)$ takes on a negative value, the value range limitation unit 230 sets $P_{sig}(\omega)$ to 0.

With this configuration, the coefficient update unit 300 can improve the convergence performance of the weight coefficients $A_1(\omega)$, $A_2(\omega)$, and $A_3(\omega)$.

Figure 11:
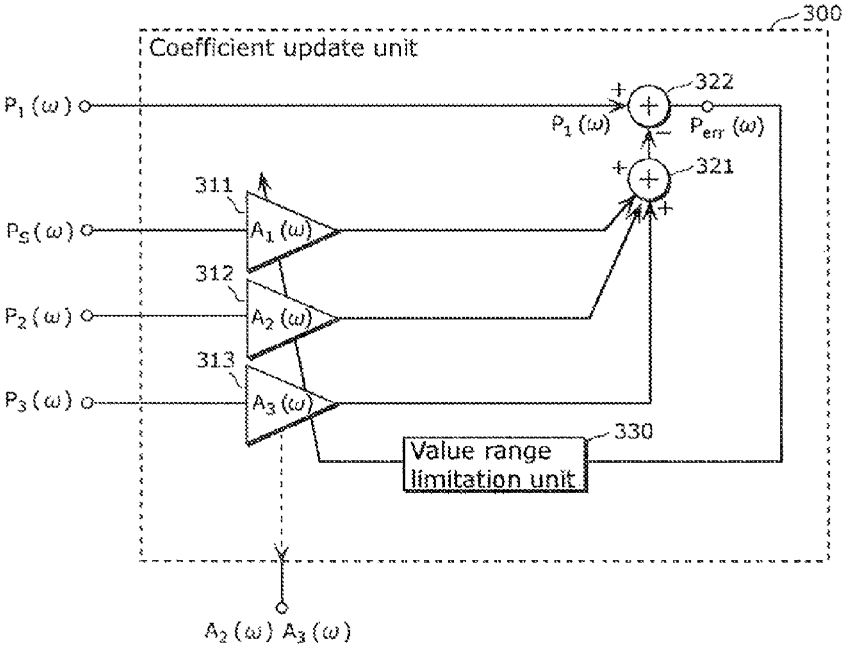
[FIG. 11]

Moreover, the coefficient update unit 300 shown in FIG. 2 may have a configuration shown in FIG. 11. A coefficient update unit 300 shown in FIG. 11 is different from the coefficient update unit 300 shown in FIG. 2 in that a value range limitation unit 330 is further included.

The value limitation unit 330 establishes a limit on a coefficient value range for the weight coefficients $A_1(\omega)$, $A_2(\omega)$, and $A_3(\omega)$ to be updated based on the estimated error power spectrum $P_{err}(\omega)$ outputted from the subtraction unit 322.

When $[A_1(\omega), A_2(\omega), A_3(\omega)]=[1, 0, 0]$, this means that the noise suppression effect is zero. Moreover, in this case, there is a singularity where coefficient update is not performed. Thus, in order to avoid $[A_1(\omega), A_2(\omega), A_3(\omega)]=[1, 0, 0]$, the value range limitation unit 330 sets minimum values of the weight coefficients $A_2(\omega)$ and $A_3(\omega)$ such that the weight coefficients $A_2(\omega)$ and $A_3(\omega)$ take on positive values. For example, the value range limitation unit 330 sets $A_2(\omega)>0$ and $A_3(\omega)>0$.

More specifically, the coefficient update unit 300 shown in FIG. 11 updates the first weight coefficient and the second weight coefficient so that each of the first weight coefficient and the second weight coefficient ($A_1(\omega)$) takes on a nonnegative value (a positive value, for example). The first weight coefficient is the weight coefficient $A_2(\omega)$ or $A_3(\omega)$.

With this configuration, a more stable operation can be performed.

Figure 12:
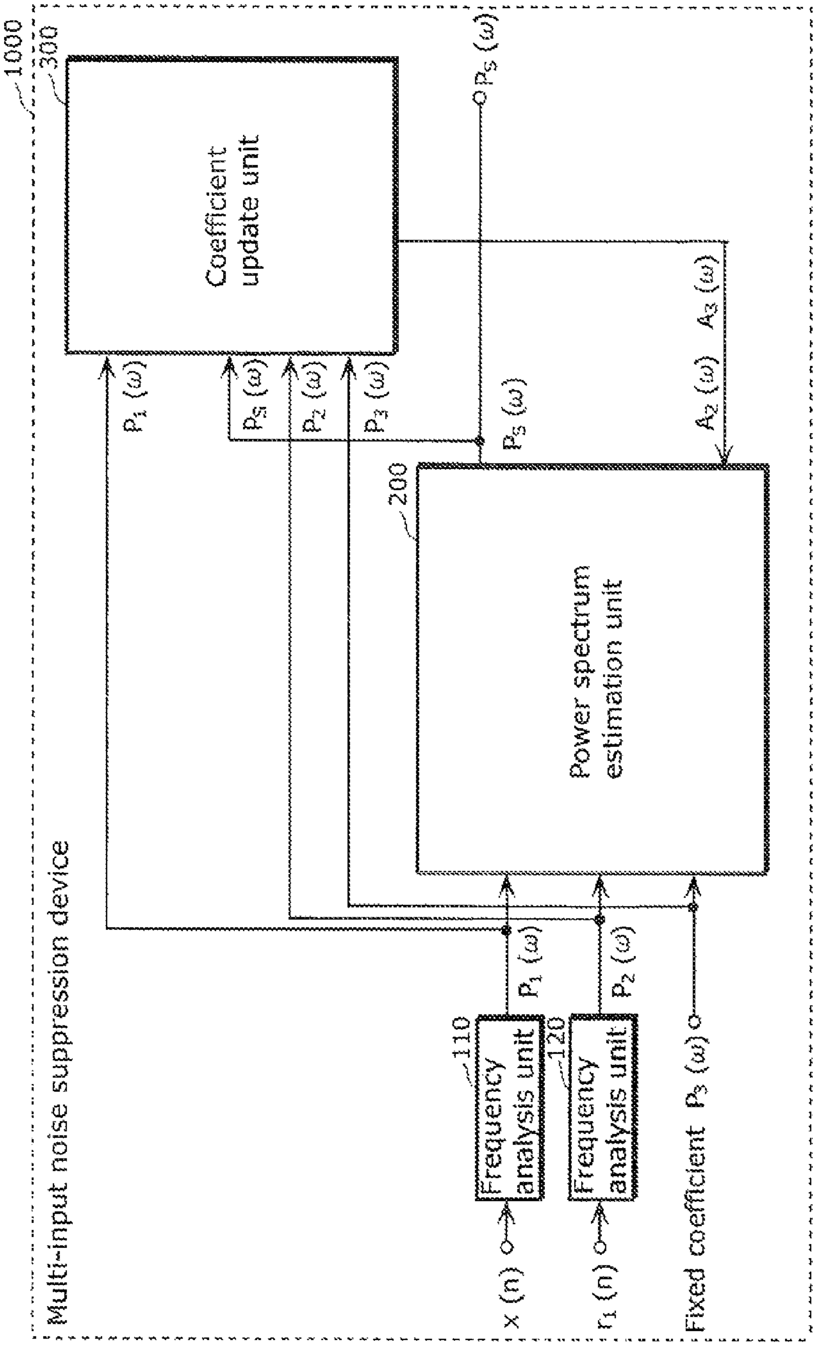
[FIG. 12]

Moreover, as shown in FIG. 12, the multi-input noise suppression device 1000 in Embodiment 1 may have a configuration to perform the noise suppression process where one of the noise reference signals (channels) to be processed is set as a fixed value (a fixed coefficient). To be more specific, the multi-input noise suppression device 1000 performs the process using the plurality of noise reference signals, and one of the reference power spectrums respectively corresponding to the plurality of noise reference signals is a fixed value.

When a level of circuit noise of a system included in the main signal x(n) or a level of circuit noise of a sensor connected to the multi-input noise suppression device 1000 included in the main signal x(n) is high, for example, this causes a problem in the learning of a weight coefficient. In such a case, the value of the power spectrum $P_3(\omega)$, for example, may be set to a fixed value (i.e., a fixed coefficient) to express a stationary noise such as circuit noise, so that the learning operation can be improved.

The number of noise reference signals used by the multi-input noise suppression device 1000 in Embodiment 1 is two, which are the noise reference signals $r_1(n)$ and $r_2(n)$. However, the number of noise reference signals is not limited to two. The multi-input noise suppression device 1000 may perform the noise suppression process using one main signal and one noise reference signal (this configuration may also be referred to as the configuration A hereafter). The noise reference signal $r_1(n)$, for example, may be used as this single noise reference signal.

In the configuration A, the power spectrum estimation unit 200 does not use the addition unit 221. In this case, the power spectrum outputted from the multiplication unit 212 is inputted into the subtraction unit 222. Then, the subtraction unit 222 calculates the power spectrum $P_{sig}(\omega)$ by subtracting the power spectrum outputted from the multiplication unit 212 from the power spectrum $P_1(\omega)$ for each of the frequency components. Moreover, the filter calculation unit 250 calculates (estimates) the estimated target sound power spectrum $P_s(\omega)$ using the power spectrum $P_1(\omega)$ and the second power spectrum $P_{sig}(\omega)$.

In the configuration A, the power spectrum estimation unit 200 performs the estimation process to obtain the estimated target sound power spectrum $P_s(\omega)$, based on the main power spectrum (the power spectrum $P_1(\omega)$) and on the first calculated value obtained by at least multiplying the reference power spectrum by the first weight coefficient ($A_2(\omega)$).

Moreover, in the configuration A, the coefficient update unit 300 does not use the multiplication unit 313. In this case, the addition unit 321 adds the two weighted power spectrums outputted from the multiplication units 311 and 312 for each of the frequency components, and then outputs the power spectrum obtained as a result of the addition.

The subtraction unit 322 outputs, as the estimated error power spectrum $P_{err}(\omega)$, a result of subtracting the power spectrum outputted from the addition unit 321 from the power spectrum $P_1(\omega)$ for each of the frequency components. Then, as described above, the coefficient update unit 300 updates the weight coefficients $A_1(\omega)$ and $A_2(\omega)$.

To be more specific, in the configuration A, the coefficient update unit 300 updates the first weight coefficient and the second weight coefficient so that the second calculated value approximates to the main power spectrum. The second calculated value is obtained by adding at least two values obtained by multiplying the reference power spectrum and the estimated target sound power spectrum by the first weight coefficient and the second weight coefficient, respectively. Here, the second calculated value is the power spectrum outputted from the addition unit 321.

Moreover, the multi-input noise suppression device 1000 may perform the noise suppression process using one main signal and three or more noise reference signals.

The power spectrum calculation unit 100 has been described to include the frequency analysis units 110, 120, and 130. The power spectrum calculation unit 100 may be implemented as hardware or signal processing software. Moreover, the frequency analysis units of the power spectrum calculation unit 100 may perform parallel processing or time-sharing processing. To be more specific, the power spectrum calculation unit 100 may have any configuration as long as the power spectrums can be calculated within the unit processing time (i.e., the frame period).

[Embodiment 2]

Figure 13:
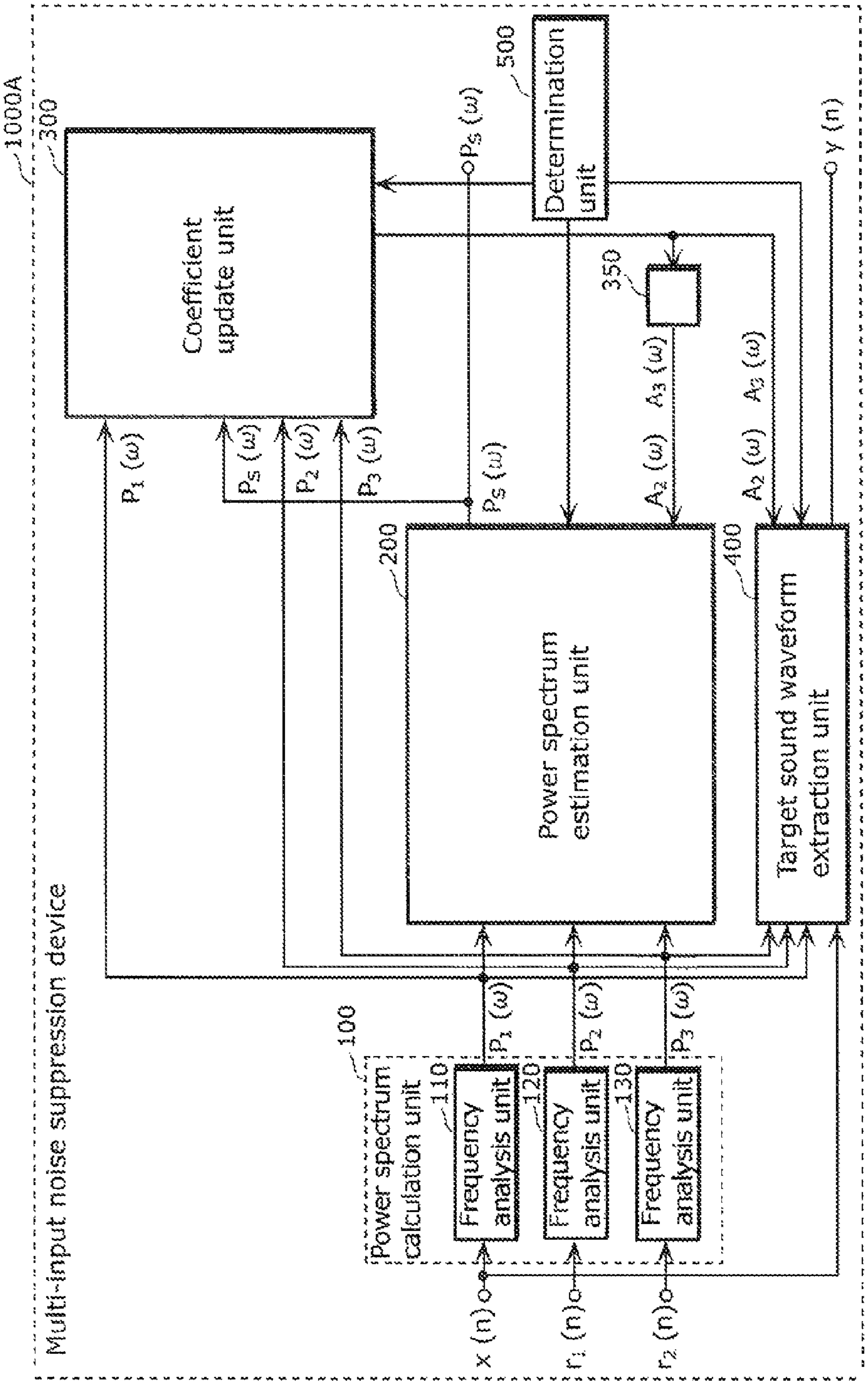
[FIG. 13]

FIG. 13 is a block diagram showing a multi-input noise suppression device 1000A in Embodiment 2. In FIG. 13, components identical to those of the multi-input noise suppression device 1000 shown in FIG. 1 are assigned the same reference signs used in FIG. 1 and are not explained again in Embodiment 2.

The multi-input noise suppression device 1000A shown in FIG. 13 is different from the multi-input noise suppression device 1000 icy shown in FIG. 1 in that a storage unit 350, a target sound waveform extraction unit 400, and a determination unit 500 are further included. In the following, a process performed by the multi-input noise suppression device 1000A may also be referred to as the noise suppression process A.

Figure 14:
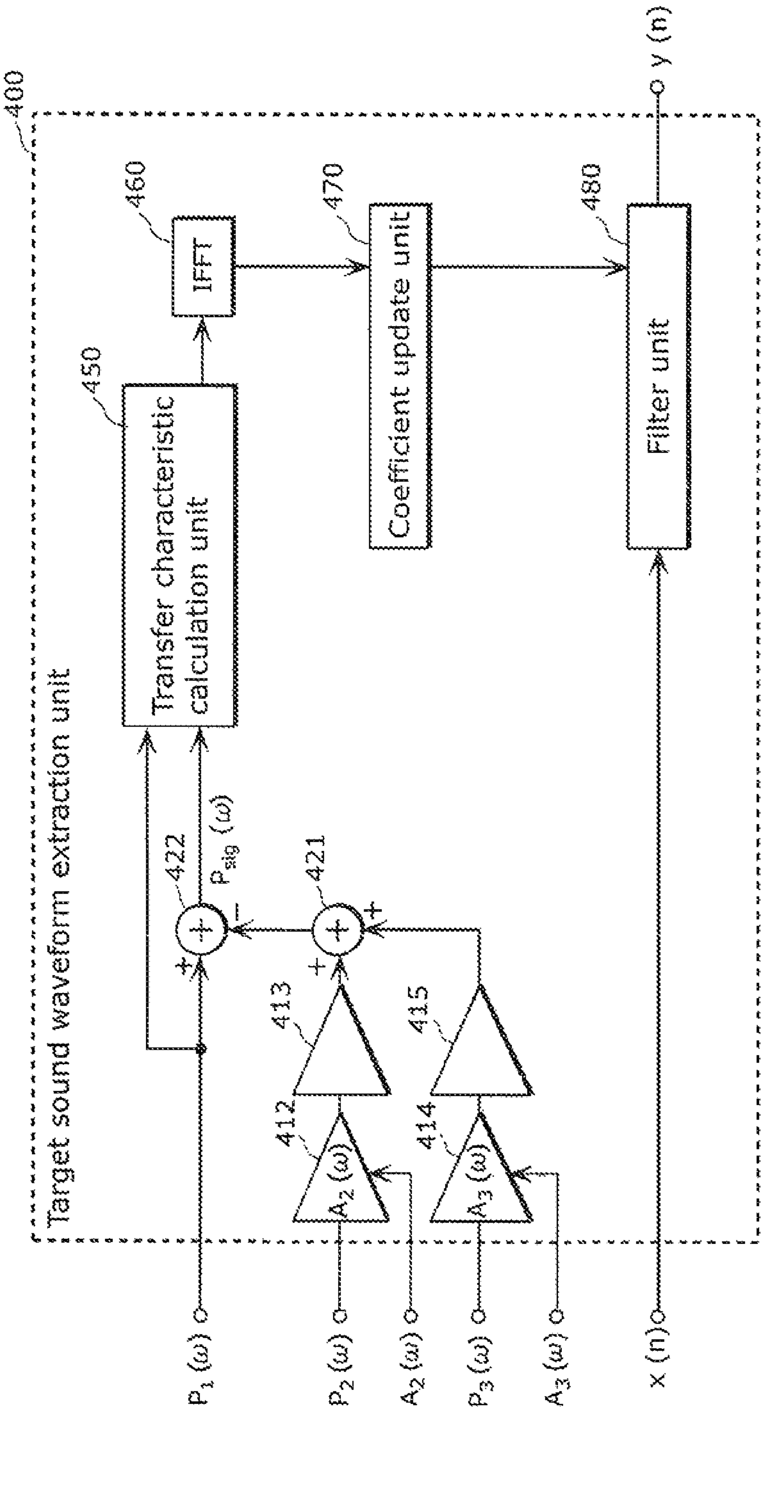
[FIG. 14]

FIG. 14 is a block diagram showing an example of a configuration of the target sound waveform extraction unit 400 in Embodiment 2.

Figure 15:
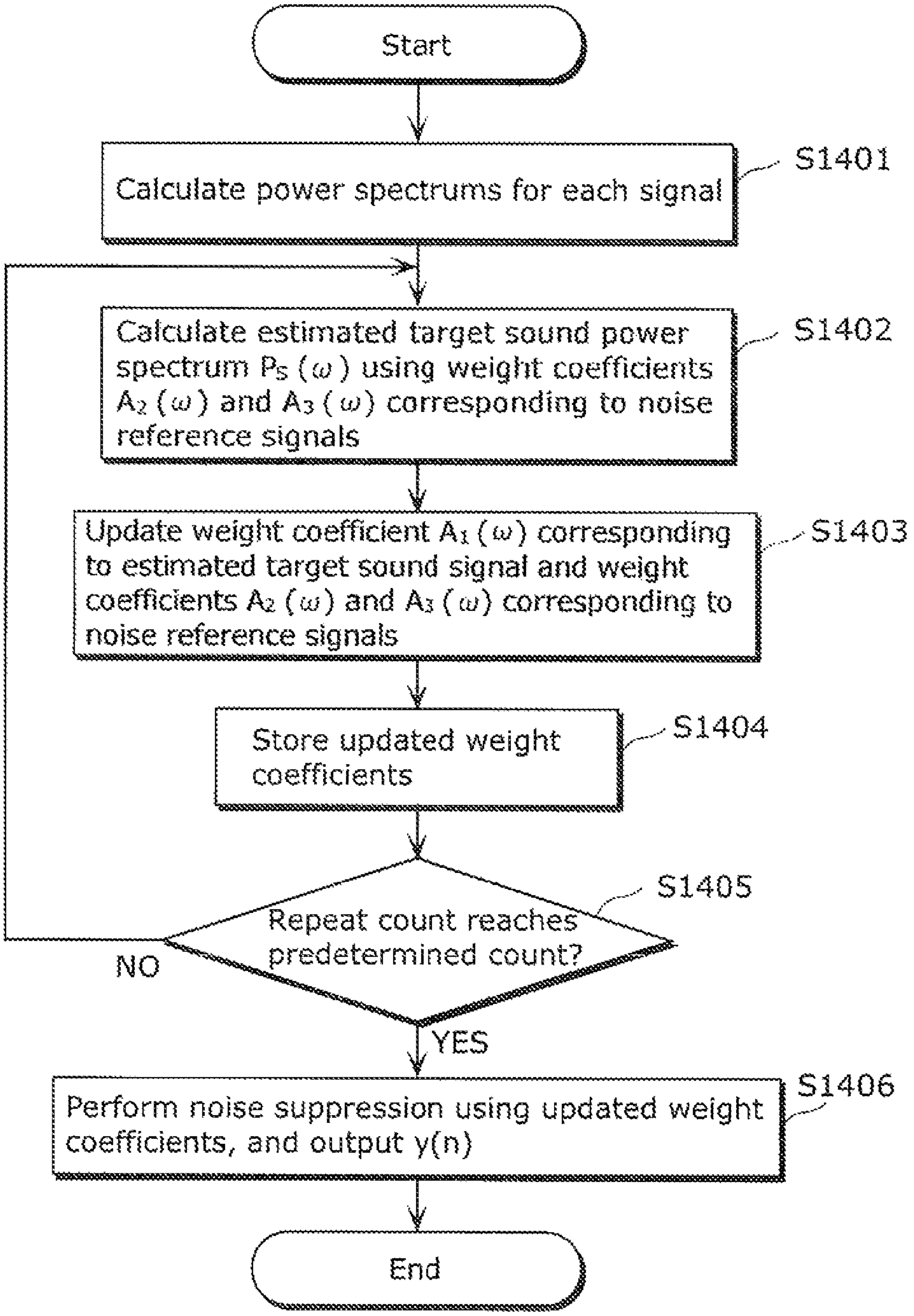
[FIG. 15]

FIG. 15 is a flowchart showing the noise suppression process A.

The following describes the configuration and operation of the multi-input noise suppression device 1000A, with reference to FIG. 13 to FIG. 15.

The target sound waveform extraction unit 400 shown in FIG. 13 outputs an output signal y(n) where noise components included in a main signal x(n) are suppressed, using the main signal x(n), a power spectrum $P_1(\omega)$ of the main signal x(n), a power spectrum $P_2(\omega)$ of a noise reference signal $r_1(n)$, a power spectrum $P_3(\omega)$ of a noise reference signal $r_2(n)$, and weight coefficients $A_2(\omega)$ and $A_3(\omega)$. The weight coefficients $A_2(\omega)$ and $A_3(\omega)$ are outputted from the coefficient update unit 300.

The power spectrum $P_1(\omega)$ is outputted from the frequency analysis unit 110. The power spectrum $P_2(\omega)$ is outputted from the frequency analysis unit 120. The power spectrum $P_3(\omega)$ is outputted from the frequency analysis unit 130.

The target sound waveform extraction unit 400 includes multiplication units 412, 413, 414, and 415, an addition unit 421, a subtraction unit 422, a transfer characteristic calculation unit 450, an inverse fast Fourier transform (IFFT) unit 460, a coefficient update unit 470, and a filter unit 480.

The storage unit 350 shown in FIG. 13 is a buffer for temporarily storing (holding) the weight coefficients $A_2(\omega)$ and $A_3(\omega)$ outputted most recently from the coefficient update unit 300. To be more specific, every time the coefficient update unit 300 outputs the first weight coefficient, the storage unit 350 stores this first weight coefficient outputted most recently from the coefficient update unit 300.

Here, suppose that the most current frame clock time is a frame clock time T(k+1). Moreover, the storage unit 350 temporarily stores (holds) the weight coefficients $A_2(\omega)$ and $A_3(\omega)$ that have been outputted from the coefficient update unit 300 in a frame period corresponding to a frame clock time Tk one time before the frame clock time T(k+1). Then, in the frame processing performed for the frame clock time T(k+1), the storage unit 350 outputs the currently-stored weight coefficient $A_2(\omega)$ and $A_3(\omega)$ to the power spectrum estimation unit 200.

The multiplication unit 412 of the target sound waveform extraction unit 400 shown in FIG. 14 multiplies the power spectrum $P_2(\omega)$ by the weight coefficient $A_2(\omega)$ for each frequency component $\omega$. Then, the multiplication unit 412 outputs, as an output signal, the signal obtained as a result of the multiplication. The multiplication unit 413 multiplies the output signal received from the multiplication unit 412 by a constant $\gamma_1$ for each frequency component. Then, the multiplication unit 413 outputs, as an output signal, the signal obtained as a result of the multiplication.

The multiplication unit 414 multiplies the power spectrum $P_3(\omega)$ by the weight coefficient $A_3(\omega)$ for each frequency component. Then, the multiplication unit 414 outputs, as an output signal, the signal obtained as a result of the multiplication. The multiplication unit 415 multiplies the output signal received from the multiplication unit 414 by a constant $\gamma_2$ for each frequency component. Then, the multiplication unit 415 outputs, as an output signal, the signal obtained as a result of the multiplication.

The addition unit 421 adds the output signal from the multiplication unit 413 to the output signal from the multiplication unit 415 for each same frequency component. Then, the addition unit 421 outputs, as an output signal, the signal obtained as a result of the addition.

The subtraction unit 422 calculates the power spectrum $P_{sig}(\omega)$ by subtracting the output signal of the addition unit 421 from the power spectrum $P_1(\omega)$ of the main signal x(n) for each frequency component. Then, the subtraction unit 422 outputs the calculated power spectrum $P_{sig}(\omega)$.

The transfer characteristic calculation unit 450 calculates a Wiener filter characteristic $H_w(\omega)$ using the power spectrum $P_1(\omega)$ of the main signal x(n) and the power spectrum $P_{sig}(\omega)$ outputted from the subtraction unit 422. Then, the transfer characteristic calculation unit 450 outputs the calculated Wiener filter characteristic $H_w(\omega)$.

The IFFT unit 460 performs inverse fast Fourier transform on the Wiener filter characteristic $H_w(\omega)$ outputted from the transfer characteristic calculation unit 450 to calculate a filter coefficient for as each frame. Then, the IFFT unit 460 outputs the signals indicating a plurality of calculated filter coefficients.

The coefficient update unit 470 smoothes the filter coefficient varying for each amount of frame shift, for the output signal of the IFFT unit 460. Then, the coefficient update unit 470 generates a time-varying coefficient that continuously varies, and then outputs the generated time-varying coefficient.

The filter unit 480 generates an output signal y(n) by convoluting the time-varying coefficient into the main signal x(n), and then outputs the generated output signal y(n).

To be more specific, the target sound waveform extraction unit 400 estimates the target sound power spectrum using the first weight coefficient and the second weight coefficient updated by the coefficient update unit 300. Then, the target sound waveform extraction unit 400 at least performs a transform to express the estimated target sound power spectrum in the time domain so as to extract (output) a signal waveform of the target sound. Here, the signal waveform of the target sound refers to a waveform of the output signal y(n).

An operation performed by the target sound waveform extraction unit 400 configured as described above is explained.

Suppose that the constant used by the multiplication unit 413 is $\gamma_1$ and that the constant used by the multiplication unit 415 is $\gamma_2$. In this case, the subtraction unit 422 calculates the power spectrum $P_{sig}(\omega)$ according to Equation 25.

[Math. 25]

$$P_{sig}(\omega)=P_1(\omega)-(\gamma_1 A_2(\omega)P_2(\omega)+\gamma_2 A_3(\omega)P_3(\omega)) \quad \text{Equation 25}$$

In Equation 25, when $\gamma_1=\gamma_2=1$, the power spectrum $P_{sig}(\omega)$ is the estimated target sound power spectrum.

Here, $\gamma_1$ and $\gamma_2$ are set because the amount of suppression is controlled in consideration that the estimated weight coefficients $A_2(\omega)$ and $A_3(\omega)$ may have slight errors or may have errors from ideal values due to variations in the noise transfer system. Note that $\gamma_1$ and $\gamma_2$ can take values within a range expressed approximately as $0\leq(\gamma_1, \gamma_2)\leq 10$.

The transfer characteristic calculation unit 450 calculates the transfer characteristic $H_w(\omega)$ using Equation 26, according to the Wiener filter characteristic commonly used in noise suppression.

[Math. 26]

$$Hw(\omega) = \frac{[P_{sig}(\omega)]_{min=0}}{P_1(\omega)} + \beta(\omega) \quad \text{Equation 26}$$

However, when $P_{sig}(\omega)$ is to be calculated according to Equation 25, there may be a case where $P_{sig}(\omega)$ has a negative value. Thus, when $P_{sig}(\omega)<0$, $P_{sig}(\omega)$ is set to 0 for each frequency component by $[\cdot]_{min=0}$ of the numerator in the first term on the right side of Equation 26. Here, "$\beta(\omega)$" on the right hand of Equation 26 is called a flooring coefficient and is a constant to establish a limit on the maximum amount of suppression. Note that $\beta(\omega)$ takes on a value within a range expressed as $0\leq\beta(\omega)\leq 1$.

The IFFT 460 performs IFFT (inverse fast Fourier transform) on $H_w(\omega)$ to transform the transfer characteristic $H_w(\omega)$ into an impulse response, as expressed by Equation 27.

[Math. 27]

$$hw(n)=F^{-1}\{Hw(\omega)\} \quad \text{Equation 27}$$

In Equation 27, "$F^{-1}$" represents the inverse Fourier transform.

Although the process up to the IFFT unit 460 is performed on a frame-by-frame basis, the process performed in the latter stage using the time-varying coefficient FIR filter is performed on a sample-by-sample basis. Therefore, the coefficient update unit 470 updates (controls) the filter coefficient for each sample so that the filter coefficient continuously varies. To do so, the coefficient update unit 470 performs, for example, linear interpolation on the impulse response outputted from the IFFT unit 460 for each cycle of the frame shift amount.

The filter unit 480 convolutes the time-varying coefficient from the coefficient update unit 470 into the main signal x(n), and then outputs the output signal y(n) obtained as a result of the convolution.

In this way, the power spectrum $P_{sig}(\omega)$ used for noise suppression is obtained using the estimated weight coefficients $A_2(\omega)$ and $A_2(\omega)$, and then the filter unit 480 performs filtering to implement the noise suppression.

The noise suppression process A in FIG. 15 is repeated multiple times. One noise suppression process A is performed over the frame period, as with the noise suppression process shown in FIG. 7. Here, suppose that the noise suppression process A is started at a frame clock time T(k+1) (where “k” is an integer equal to or greater than 1). The process where the noise suppression process A is repeated multiple times corresponds to a multi-input noise suppression method in Embodiment 2.

In step S1401, the same process as in step S1001 of FIG. 7 is performed and, therefore, the detailed description is not repeated here. With this step, the power spectrum calculation unit 100 calculates the power spectrums $P_1(\omega)$, $P_2(\omega)$, and $P_3(\omega)$ of the frame clock time T(k+1) using the main signal x(n) an the noise reference signals $r_1(n)$ and $r_2(n)$, and then outputs the calculated power spectrums $P_1(\omega)$, $P_2(\omega)$, and $P_3(\omega)$. Each of the processes performed by the frequency analysis units 110, 120, and 130 of the power spectrum calculation unit 100 has been described above and, therefore, the detailed explanation is not repeated here.

Next, in step S1402, the same process as in step S1002 of FIG. 7 is performed and, therefore, the detailed description is not repeated here.

The following is a brief description. The power spectrum estimation unit 200 calculates (estimates) the estimated target power spectrum $P_s(\omega)$ using: the power spectrums $P_1(\omega)$, $P_2(\omega)$, and $P_3(\omega)$ of the frame clock time T(k+1); and the weight coefficients $A_2(\omega)$ and $A_3(\omega)$ stored in the storage unit 350 corresponding to the frame clock time Tk. Then, the power spectrum estimation unit 200 outputs the estimated target power spectrum $P_s(\omega)$ obtained as a result of the calculation. The frame clock time Tk refers to a frame clock time one time before the frame clock time T(k+1). The weight coefficients $A_2(\omega)$ and $A_3(\omega)$ corresponding to the frame clock time Tk refer to the weight coefficients calculated by the coefficient update unit 300 in the frame period corresponding to the frame clock time Tk.

More specifically, in step S1402, the power spectrum estimation unit 200 obtains the estimated target power spectrum, by at least multiplying the reference power spectrum calculated upon the expiration of the $k+1^{th}$ unit clock time by the first weight coefficient updated by the coefficient update unit 300 upon the expiration of the $k^{th}$ unit clock time. Then, the power spectrum estimation unit 200 outputs the estimated target sound power spectrum.

Next, in step S1403, the same process as in step S1003 of FIG. 7 is performed and, therefore, the detailed description is not repeated here.

The following is a brief description. The coefficient update unit 300 updates the weight coefficients $A_1(\omega)$, $A_2(\omega)$, and $A_3(\omega)$ corresponding to the frame clock time T(k+1), using the power spectrums $P_1(\omega)$, $P_2(\omega)$, and $P_3(\omega)$ outputted from the power spectrum calculation unit 100 and the estimated target sound power spectrum $P_s(\omega)$ outputted from the filter calculation unit 250. Moreover, the coefficient update unit 300 outputs the updated weight coefficients $A_2(\omega)$ and $A_3(\omega)$ to the target sound waveform extraction unit 400.

More specifically, in step S1403, the coefficient update unit 300 updates the first weight coefficient and the second weight coefficient using the first weight coefficient and the second weight coefficient having been updated the last time.

In step S1404, the coefficient update unit 300 stores the updated weight coefficient $A_2(\omega)$ and $A_3(\omega)$ into the storage unit 350.

Next, in step S1405, the determination unit 500 determines whether or not a repeat count of the process from step S1402 to step S1404 reaches a predetermined count. To be more specific, the determination unit 500 determines whether or not the number of updates performed on the first weight coefficient and the second weight coefficient by the coefficient update unit 300 is equal to or greater than a predetermined number of times.

When it is determined to be YES in step S1405, the process proceeds to step S1406. On the other hand, when it is determined to be NO in step S1405, k is incremented by one and step S1402 is thus performed again.

Here, suppose that it is determined to be NO in step S1405 and that steps S1402 and S1403 are thus performed again. More specifically, when the determination unit 500 determines that the number of updates is smaller than the predetermined number of times, the power spectrum estimation unit 200 performs step S1402. Moreover, when the determination unit 500 determines that the number of updates is smaller than the predetermined number of times, the coefficient update unit 300 performs step S1403.

In step S1406, the target sound waveform extraction unit 400 generates, from the main signal x(n), the output signal y(n) by suppressing the noise using the weight coefficients $A_2(\omega)$ and $A_3(\omega)$ updated most recently in the frame period corresponding to the clock time T(k+1), and then outputs the generated output signal y(n). The process performed by the target sound waveform extraction unit 400 to generate the output signal y(n) from the main signal x(n) has been described above with reference to FIG. 14 and, therefore, the detailed description is not repeated here.

It should be noted that, in the noise suppression process A, the weight coefficients may be updated by the process of steps S1402 and S1403 performed only once as described in Embodiment 1. Here, these steps are performed in the order in which the process of the coefficient update unit 300 is performed after the process of the power spectrum estimation unit 200 in one frame period.

In order to further increase the noise suppression accuracy, the weight coefficients may be updated by the process of steps S1402 and S1403 performed multiple times as described in Embodiment 2. Here, these steps are performed in the order in which the process of the coefficient update unit 300 is performed after the process of the power spectrum estimation unit 200 within one frame period.

When the predetermined number of times used in the determination made in step S1405 is greater, the accuracy of the weight coefficients is further increased. However, there is a limit on the repeat count because of a relationship between the amount of frame shift and the calculation speed. For this reason, the predetermined number of times is set to one or more and is smaller than a repeat count corresponding to a processing limit of the multi-input noise suppression device 1000A.

In this way, the multi-input noise suppression device 1000A repeats the process from step S1401 to step S1406 on a frame-by-frame basis. The repeat count for this process is one or more. There is a limit on an upper limit for the repeat count, depending on a relationship between the frame shift amount and the calculation speed.

Note that the process performed by the coefficient update unit 300 to update the weight coefficients is identical to the process performed using Equation 18 or 14 in Embodiment 1.

Figure 16:
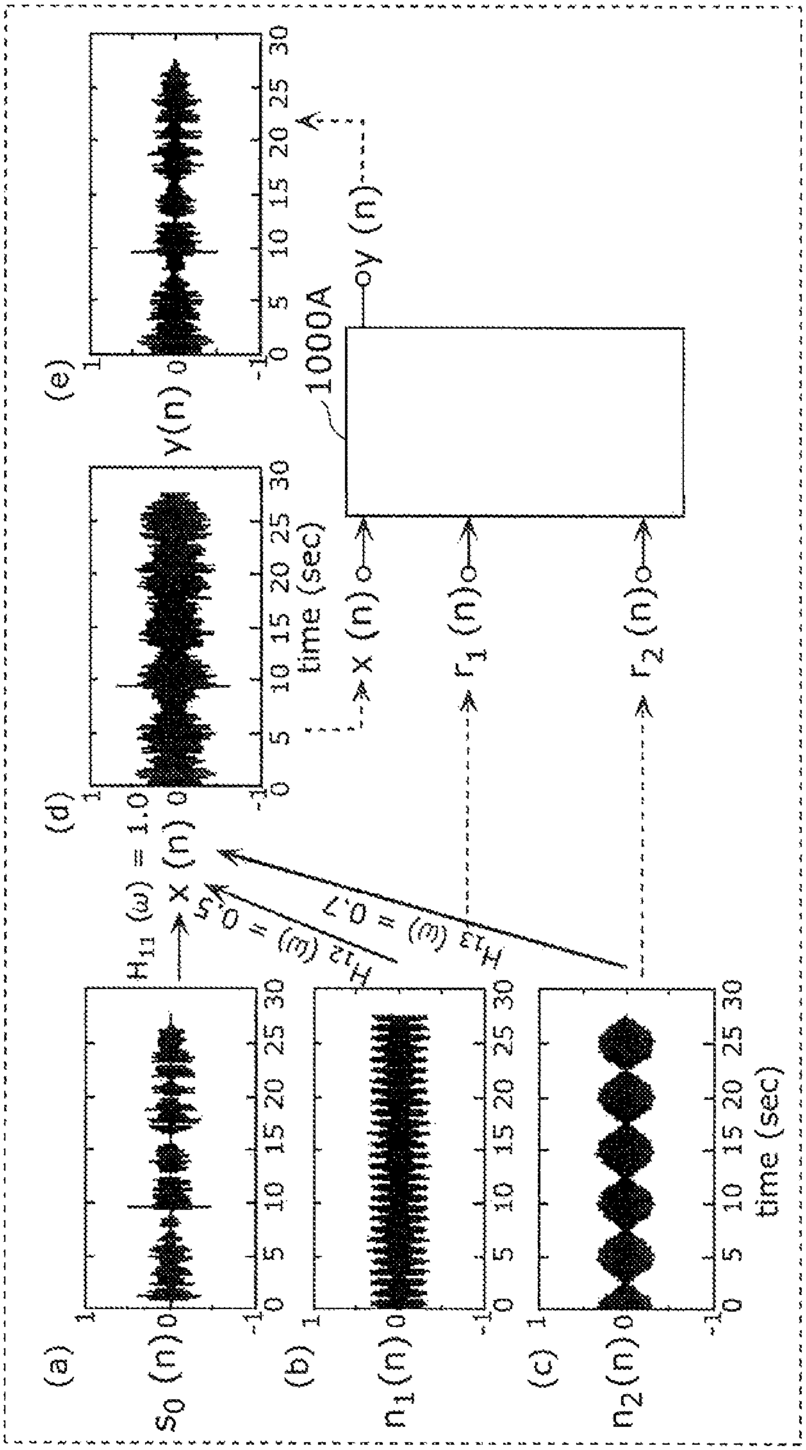
[FIG. 16]

FIG. 16 is a diagram showing waveforms of input and output signals received by the multi-input noise suppression device 1000A in Embodiment 2. Here, the input signals are the same as shown in FIG. 8.

In FIG. 16, (a) to (d) are the same as (a) to (d) shown in FIG. 8, respectively, and therefore, the detailed explanations are not repeated here.

In FIG. 16, (e) shows the output signal y(n) outputted from the target sound waveform extraction unit 400. As the weight coefficient corresponding to the input signal x(n) including the noise converges with the passage of time, the waveform of the output signal y(n) approximates to the waveform of the target sound $S_0(n)$.

It should be noted that the multi-input noise suppression device 1000A may perform the noise suppression process A using the main signal x(n) and the noise reference signals $r_1(n)$ and $r_2(n)$ shown in FIG. 17 described below.

Figure 17:
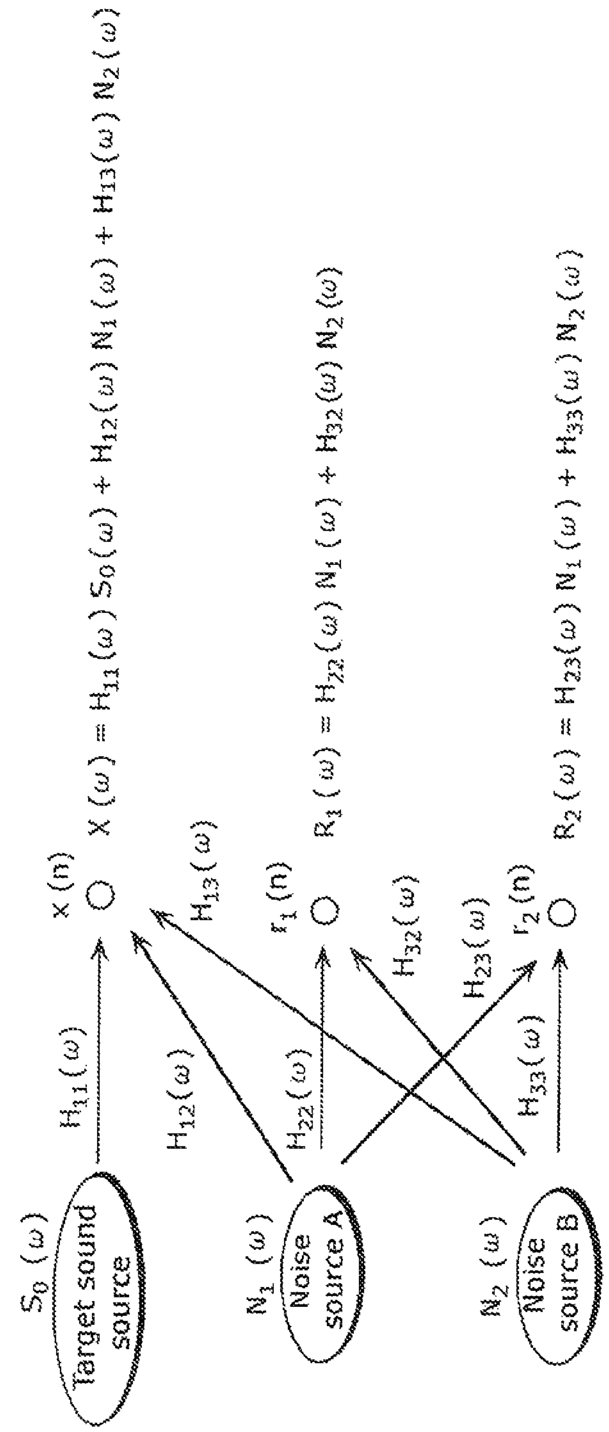
[FIG. 17]

FIG. 17 is a diagram showing the signals in the case where crosstalk exists between the noise reference signals $r_1(n)$ and $r_2(n)$. Reference signs and equations in FIG. 17 that are identical to those shown in FIG. 3 are not explained again here.

In FIG. 17, when $R_1(\omega)$ is influenced by the crosstalk indicated as $H_{32}(\omega)N_2(\omega)$, $R_1(\omega)$ is represented by the equation shown in FIG. 17. Moreover, when $R_2(\omega)$ is influenced by the crosstalk indicated as $H_{23}(\omega)N_1(\omega)$, $R_2(\omega)$ is represented by the equation shown in FIG. 17.

Figure 18:
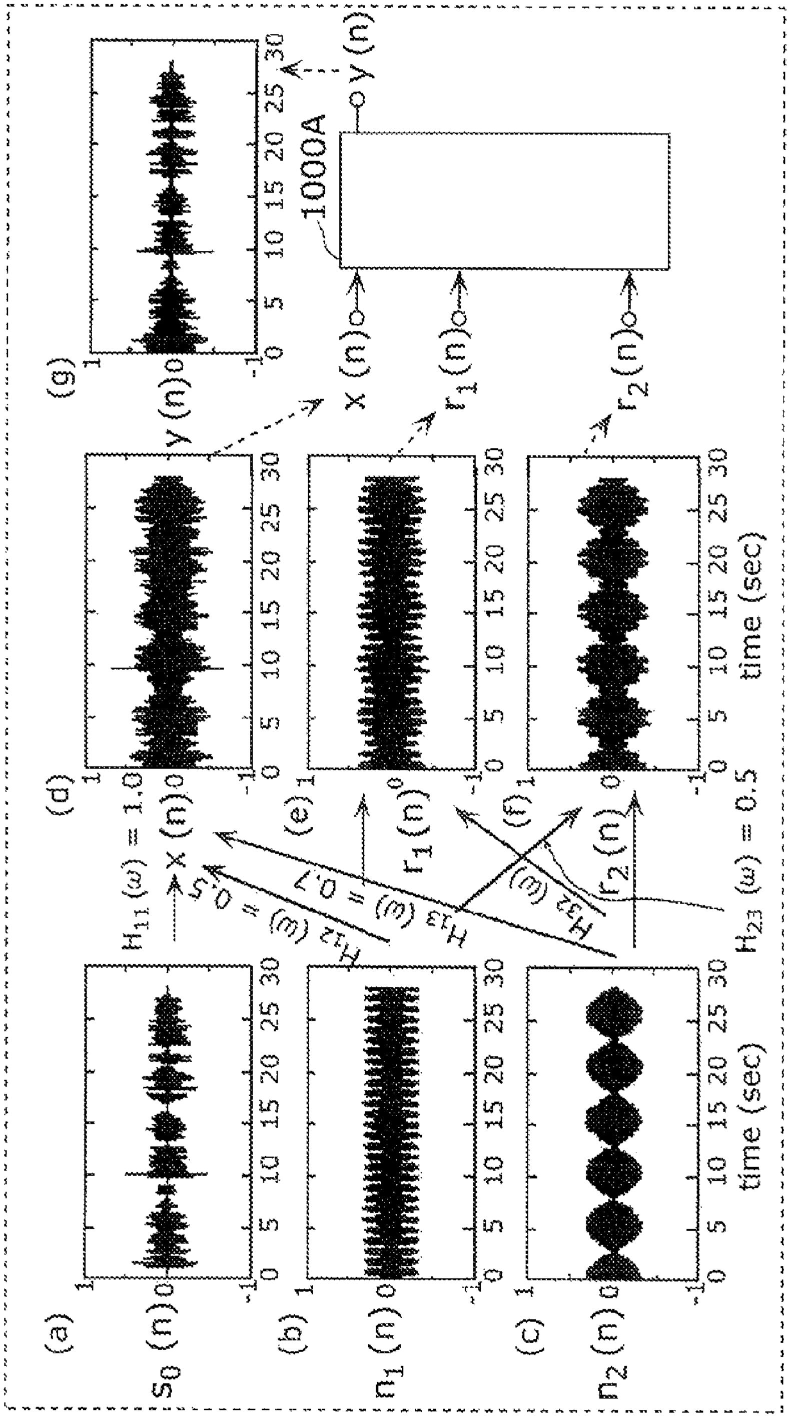
[FIG. 18]

FIG. 18 shows waveforms of input and output signals of the multi-input noise suppression device 1000A when: $H_{11}(\omega)=H_{22}(\omega)$ $H_{33}(\omega)=1$; $H_{12}(\omega)=0.5$; $H_{13}(\omega)=0.7$; $H_{32}(\omega)=0.5$; and $H_{23}(\omega)=0.5$ In FIG. 18, (a) to (d) are the same as (a) to (d) shown in FIG. 8, respectively, and therefore, the detailed explanations are not repeated here.

In FIG. 18: (e) shows the waveform of the noise reference signal $r_1(n)$, and (f) shows the waveform of the noise reference signal $r_2(n)$. In FIG. 18, (g) is the same as (e) shown in FIG. 16 and, therefore, the detailed explanation is note repeated here.

Except for a special case where the noise reference signal $r_1(n)$ is identical to the noise reference signal $r_2(n)$, even when there is crosstalk between the noise reference signal $r_1(n)$ and the noise reference signal $r_2(n)$, the multi-input noise suppression device 1000A can suppress the noise in the same manner as in the case of using the signals shown in FIG. 16 as long as each of the power spectrums can be expressed by Equation 12 as in Embodiment 1.

According to the multi-input noise suppression device 1000A in Embodiment 2 as described thus far, the waveform of the target sound can be extracted by the target sound waveform extraction unit 400, in addition to the advantageous effects in Embodiment 1. More specifically, the target sound can be outputted.

It should be noted that, without using the target sound waveform extraction unit 400, the waveform of the target sound can be extracted by performing IFFT on the target sound power spectrum $P_s(\omega)$. However, as described in Embodiment 2, the waveform (i.e., the target sound) where the noise has been more suppressed can be obtained by using the most recent weight coefficients $A_2(\omega)$ and $A_3(\omega)$ and using the multiplication units 413 and 415.

Figure 19:
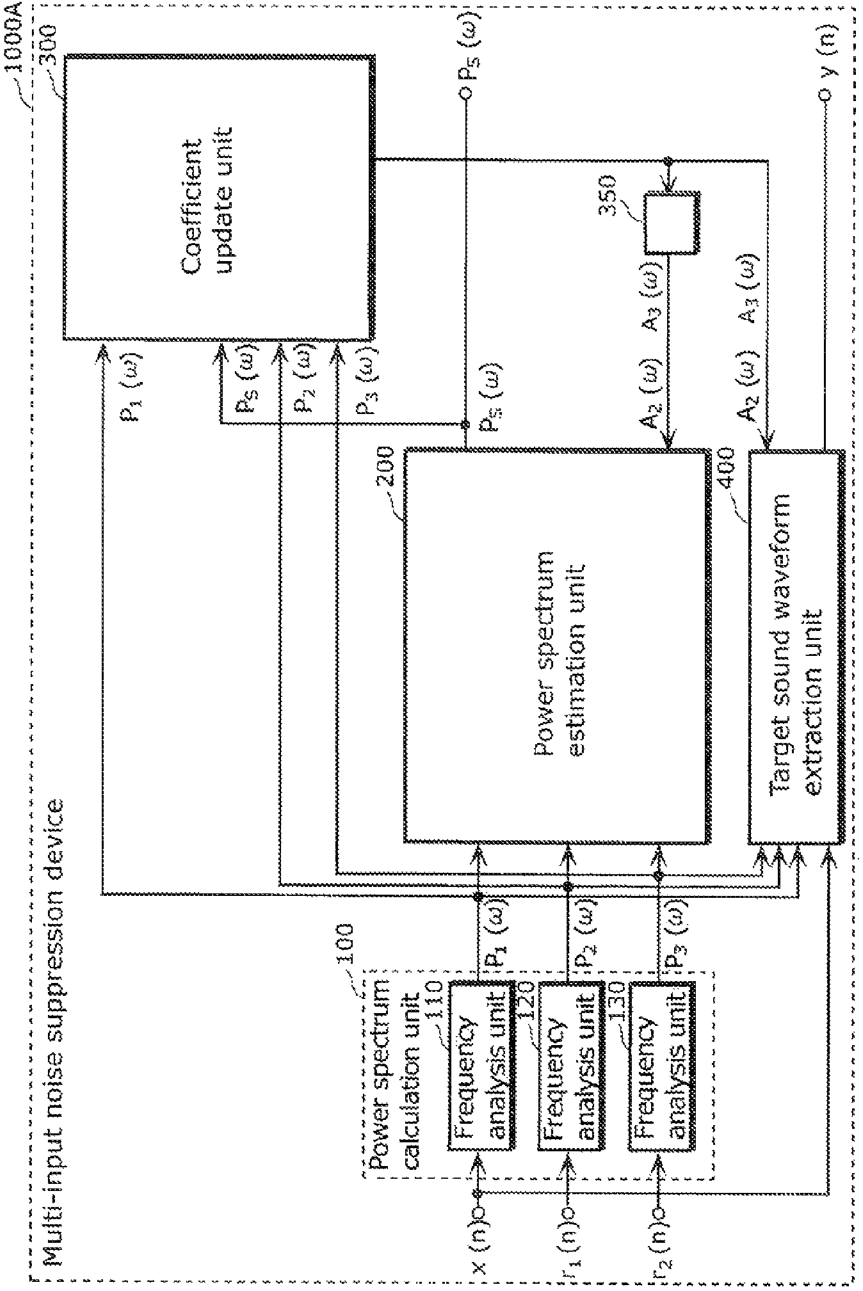
[FIG. 19]

The multi-input noise suppression device 1000A includes the determination unit 500. However, as shown in FIG. 19, the multi-input noise suppression device 1000A may not include the determination unit 500. In this case, the power spectrum estimation unit 200 repeats step S1402 of the noise suppression process A only a predetermined number of times. Moreover, the coefficient update unit 300 repeats steps S1403 and S1404 of the noise suppression process A only a predetermined number of times. After this, step S1406 is performed.

The number of noise reference signals used by the multi-input noise suppression device 1000A in Embodiment 2 is two, which are the noise reference signals $r_1(n)$ and $r_2(n)$. However, the number of noise reference signals is not limited to two. As with Embodiment 1, the multi-input noise suppression device 1000A may perform the noise suppression process A using one main signal and one noise reference signal. The noise reference signal $r_1(n)$, for example, may be used as this single noise reference signal. Moreover, the multi-input noise suppression device 1000A may perform the noise suppression process A using one main signal and three or more noise reference signals.

[Embodiment 3]

Figure 20:
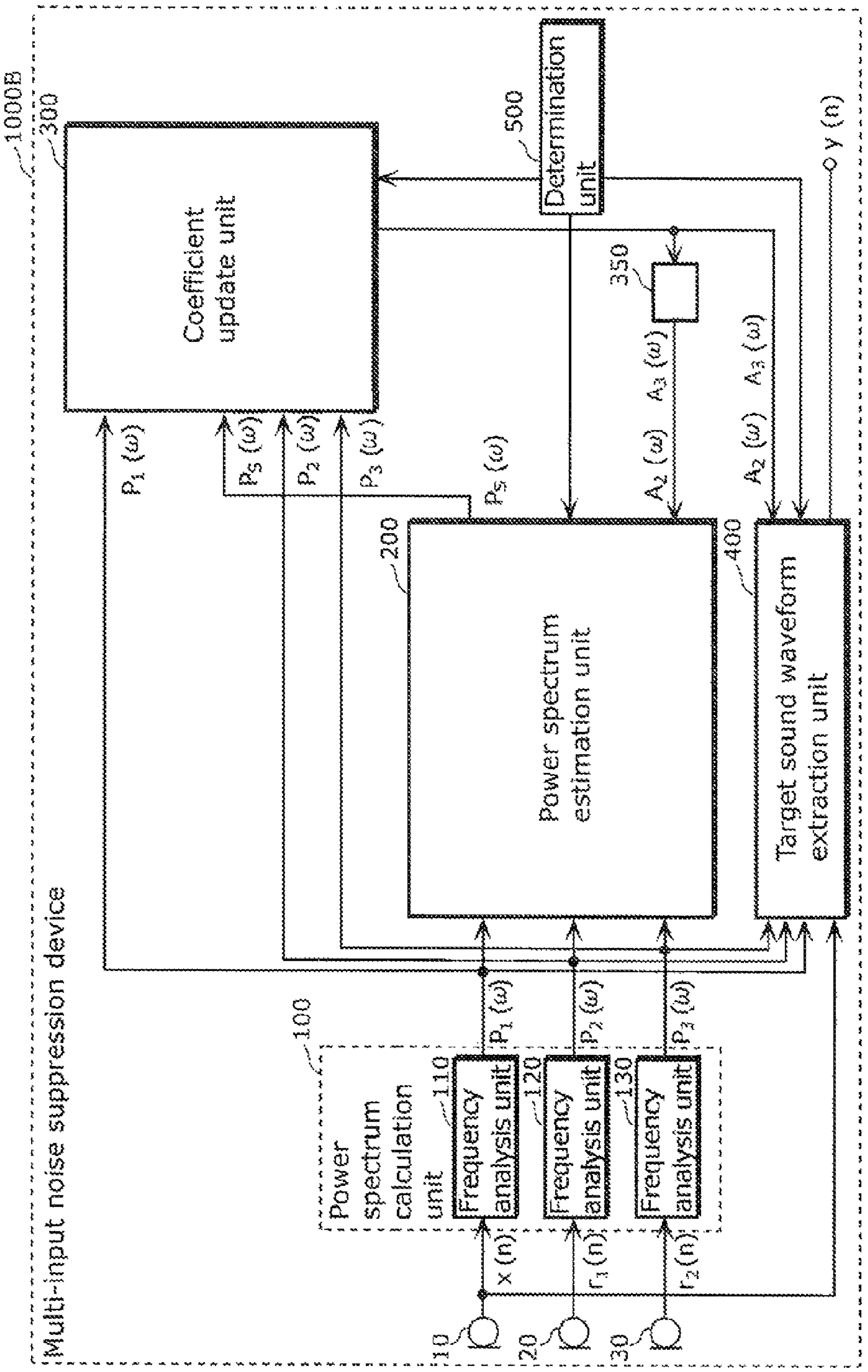
[FIG. 20]

FIG. 20 is a block diagram showing a multi-input noise suppression device 1000B in Embodiment 3. In FIG. 20, components identical to those of the multi-input noise suppression device shown in FIG. 13 are assigned the same reference signs used in FIG. 13 and are not explained again in Embodiment 3.

The multi-input noise suppression device 1000B shown in FIG. 20 is different from the multi-input noise suppression device 1000A shown in FIG. 13 in that microphones 10, 20, and 30 are further included. The rest of the configuration and the function of the multi-input noise suppression device 1000B are the same as those of the multi-input noise suppression device 1000A and, therefore, the detailed explanations are not repeated.

The microphone 10 is configured to receive only a main signal x(n). The microphone 20 is configured to receive only a noise reference signal $r_1(n)$. The microphone 30 is configured to receive only a noise reference signal $r_2(n)$.

In other words, the multi-input noise suppression device 1000B operates as a directional microphone device.

Next, an operation performed by the multi-input noise suppression device 1000B is described.

In the following, suppose that a target sound source emitting a target sound is located at 0 degrees in front of the multi-input noise suppression device 1000B in Embodiment 3. The sound pressure sensitivity, represented by a polar pattern, of the microphone to the target sound is indicated by a graph value at 0 degrees in front. The polar pattern is a circular graph showing, in 360 degrees, the directional characteristics of the sound to be picked up.

Hereafter, a direction from which the target sound is emitted may also be referred to as the target sound direction, in relation to the location of the multi-input noise suppression device 1000B.

The microphone 10 receives the main signal x(n). Therefore, the microphone 10 uses a characteristic having the sensitivity in the target sound direction (i.e., 0 degrees in front). In particular, it is preferable for the microphone 10 to have the directional characteristics showing the maximum sensitivity at 0 degrees in front. The microphone 10 sends the received signal to the frequency analysis unit 110 and the target sound waveform extraction unit 400.

Figure 21:
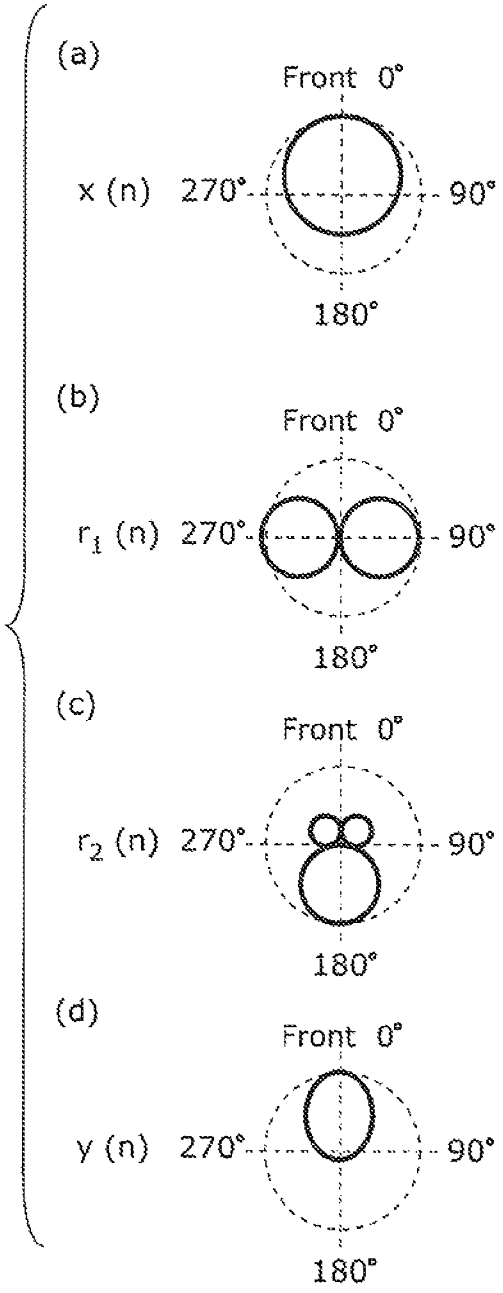
[FIG. 21]

In FIG. 21, (a) shows an example of the directional characteristics of the microphone 10. More specifically, the microphone 10 is a main microphone that has the sensitivity in a direction of an output source of the target sound and receives the main signal x(n). In other words, the microphone 10 has a higher sensitivity in the direction of the output source of the target sound (i.e., the target sound source) than in a direction of a different sound source (such as a noise source A).

The microphone 20 receives the noise reference signal $r_1(n)$. More specifically, the microphone 20 is a reference microphone for receiving the noise reference signal $r_1(n)$. Therefore, the microphone 20 has a directional characteristic including a dead spot in the sensitivity in the target sound direction (i.e., 0 degrees in front). The microphone 20 sends the received signal to the frequency analysis unit 120.

In FIG. 21, (b) shows an example of the directional characteristics of the microphone 20. As an example, the microphone 20 has bidirectional characteristics showing the maximum sensitivities at 90 degrees and 270 degrees.

The microphone 30 receives the noise reference signal $r_2(n)$. More specifically, the microphone 30 is a reference microphone for receiving the noise reference signal $r_2(n)$. Therefore, in order to effectively use the plurality of noise reference signals, the microphone 30 has directional characteristics different from the microphones 10 and 20. The microphone 30 sends the received signal to the frequency analysis unit 130.

In FIG. 21, (c) shows an example of the directional characteristics of the microphone 30. In order to receive the noise reference signal $r_2(n)$, the microphone 30 has bidirectional characteristics including a dead spot in the sensitivity at 0 degrees in front, as an example. Moreover, the microphone 30 also has the bidirectional characteristics including dead spots in the sensitivity at 90 degrees and 270 degrees, as an example, to reduce crosstalk with the signal inputted into the microphone 20. The directional characteristics of the microphone 30 correspond to a directional pattern of a second-order pressure gradient type showing the maximum sensitivity in a direction of 180 degrees.

To be more specific, each of the microphones 20 and 30 is the reference microphone having the least or minimum sensitivity in the direction of the output source of the target sound. In other words, each of the microphones 20 and 30 has approximately zero sensitivity in the direction of the output source of the target sound.

The signals inputted into the microphones 10, 20, and 30 are the input signals of the multi-input noise suppression device 1000B.

The sounds in the directions of 90 degrees and 270 degrees in the directional characteristics of the main signal x(n) (shown in (a) of FIG. 21) are suppressed by the directional characteristics of the noise reference signal $r_1(n)$ (shown in (b) of FIG. 21).

Moreover, the sound in the direction of 180 degrees in the directional characteristics of the main signal x(n) (shown in (a) of FIG. 21) is suppressed by the directional characteristics of the noise reference signal $r_2(n)$ (shown in (c) of FIG. 21).

As a result, the output signal y(n) provided by the multi-input noise suppression device 1000B is as shown in (d) of FIG. 21. More specifically, the sensitivities in the directions other than 0 degrees in front are suppressed, so that a main lobe with a narrow angle and side lobes with improved attenuations in the directions other than 0 degrees in front are obtained. Thus, an operation of a so-called side lobe suppressor can be obtained.

As described above, the target sound source is located at 0 degrees in front, in relation to the center of the polar pattern. Here, suppose that the noise source A is located at, for example, 270 degrees in relation to the center of the polar pattern. Suppose also that the noise source B is located at, for example, 180 degrees in relation to the center of the polar pattern.

In this case, the microphone 10 receives only the main signal x(n). Moreover, the microphone 20 receives only the noise reference signal $r_1(n)$, and the microphone 30 receives only the noise reference signal $r_2(n)$.

Then, the microphone 10 sends the main signal x(n) to the frequency analysis 110 and the target sound waveform extraction unit 400. Moreover, the microphone 20 sends the noise reference signal $r_1(n)$ to the frequency analysis unit 120, and the microphone 30 sends the noise reference signal $r_2(n)$ to the frequency analysis 130.

Depending on a degree, there is crosstalk between the noise reference signal $r_1(n)$ and the noise reference signal $r_2(n)$. However, as described in Embodiment 2, the multi-input noise suppression device 1000B operates without any problems even when the crosstalk is present.

Moreover, the directional patterns of the noise reference signals $r_1(n)$ and $r_2(n)$ are weighted, so that overall characteristics of the noise reference signals $r_1(n)$ and $r_2(n)$ converge to characteristics having a shape approximate to the directional pattern of the main signal in angles except around 0 degrees in front. Here, the angles of the main signal except around 0 degrees in front include 90 to 270 degrees and 10 to 350 degrees, although varying depending on the number of noise reference signals.

In this way, the multi-input noise suppression device 1000B in Embodiment 3 can perform the operation to automatically optimize the suppression weights to be assigned to the directional patterns of the plurality of noise reference signals. Thus, the multi-input noise suppression device 1000B can always learn the weight coefficients in a real sound field even when sounds are being emitted from different directions at the same time. This allows noise suppression to be performed with high accuracy.

Moreover, the multi-input noise suppression device 10008 can increase noise suppression performance and sound quality, as compared to the conventional case where control is necessary to use a ratio of levels of sounds for each direction in order to learn a state where only a target sound or a noise is emitted.

As described thus far, Embodiment 3 can implement the multi-input noise suppression device and the multi-input noise suppression method capable of estimating, by a simple process, a sound where a noise component is suppressed with high accuracy even when a plurality of sound sources are present.

[Modifications]

The multi-input noise suppression device and the multi-input noise suppression method according to the present invention have been described based on Embodiments above. However, the present invention is not limited to Embodiments described above. It is to be noted that those skilled in the art will readily appreciate that many modifications are possible in the exemplary embodiments without materially departing from the novel teachings and advantages of this invention. Accordingly, all such modifications are intended to be included within the scope of this invention.

For example, all the numerical values used in Embodiments above are only examples to specifically describe the present invention. More specifically, the present invention is not limited to the numerical values used in Embodiments above.

Moreover, the multi-input noise suppression method according to the present invention corresponds to the noise suppression process shown in FIG. 7 and the noise suppression process A shown in FIG. 15. The multi-input noise suppression method according to the present invention does not need to necessarily include all the steps corresponding to the process shown in FIG. 7 or FIG. 15. More specifically, the multi-input noise suppression method according to the present invention may include only minimum steps required for implementing the advantageous effect in the present invention.

The order in which the steps of the multi-input noise suppression method are executed is an example to specifically describe the present invention, and thus may be a different order. Moreover, some of the steps and the other steps of the multi-input noise suppression method may be independently executed in parallel.

Furthermore, although the noise reference signal has been described as a signal of a noise emitted from a noise source, the noise reference signal is not limited to this. The noise reference signal may be a signal of a sound obtained when a target sound emitted from a target sound source changes by echoing off a wall, for example.

(1) Each of the above-described multi-input noise suppression devices 1000, 1000A, and 1000B may be, specifically speaking, a computer configured with a microprocessor, a ROM, a RAM, a hard disk unit, a display unit, a keyboard, a mouse, and so forth. The RAM or the hard disk unit stores a computer program. The microprocessor operates according to the computer program, so that each function of the multi-input noise suppression devices 1000, 1000A, and 1000B is carried out. Here, note that the computer program includes a plurality of instruction codes indicating instructions to be given to the computer so as to achieve a specific function.

(2) Some or all of the components included in each of the above-described multi-input noise suppression devices 1000, 1000A, and 1000B may be realized as a single system Large Scale Integration (LSI). The system LSI is a super multifunctional LSI manufactured by integrating a plurality of components onto a signal chip. To be more specific, the system LSI is a computer system configured with a microprocessor, a ROM, a RAM, and so forth. The RAM stores a computer program. The microprocessor operates according to the computer program, so that a function of the system LSI is carried out.

Moreover, each of the multi-input noise suppression devices 1000 and 1000A may be implemented as an integrated circuit.

(3) Some or all of the components included in each of the above-described multi-input noise suppression devices 1000, 1000A, and 1000B may be implemented as an IC card or a standalone module that can be inserted into and removed from the corresponding device. The IC card or the module is a computer system configured with a microprocessor, a ROM, a RAM, and so forth. The IC card or the module may include the aforementioned super multifunctional LSI. The microprocessor operates according to the computer program, so that a function of the IC card or the module is carried out. The IC card or the module may be tamper resistant.

(4) The present invention may be the methods described above. Each of the methods may be a computer program causing a computer to execute the steps included in the method. Moreover, the present invention may be a digital signal of the computer program.

Moreover, the present invention may be the aforementioned computer program or digital signal recorded on a computer-readable recording medium, such as a flexible disk, a hard disk, a CD-ROM, an MO, a DVD, a DVD-ROM, a DVD-RAM, a Blu-ray Disc (BD), or a semiconductor memory. Also, the present invention may be the digital signal recorded on such a recording medium.

Furthermore, the present invention may be the aforementioned computer program or digital signal transmitted via a telecommunication line, a wireless or wired communication line, a network represented by the Internet, and data broadcasting.

Also, the present invention may be a computer system including a microprocessor and a memory. The memory may store the aforementioned computer program and the microprocessor may operate according to the computer program.

Moreover, by transferring the recording medium having the aforementioned program or digital signal recorded thereon or by transferring the aforementioned program or digital signal via the aforementioned network or the like, the present invention may be implemented by a different independent computer system.

(5) Embodiments described above and modifications may be combined.

Embodiments disclosed thus far only describe examples in all respects and are not intended to limit the scope of the present invention. It is intended that the scope of the present invention not be limited by Embodiments described above, but be defined by the claims set forth below. Meanings equivalent to the description of the claims and all modifications are intended for inclusion within the scope of the following claims.

INDUSTRIAL APPLICABILITY

The multi-input noise suppression device and the multi-input noise suppression method according to the present invention are useful as a noise suppression device, a directional microphone device, and the like. Moreover, the present invention can be applied to, for example, an echo suppressor in a conferencing system and a device for extracting a target signal (i.e., a target sound) using signals from a plurality of sensors of a medical device or the like.

REFERENCE SIGNS LIST

10, 20, 30 Microphone
100 Power spectrum calculation unit
110, 120, 130 Frequency analysis unit
111, 121, 131 FFT calculation unit
112, 122, 132 Power calculation unit
200 Power spectrum estimation unit
212, 213, 311, 312, 313, 412, 413, 414, 415 Multiplication unit
221, 321, 421 Addition unit
222, 322, 422 Subtraction unit
230, 330 Value range limitation unit
250, 251 Filter calculation unit
300, 470 Coefficient update unit
301, 301, 303, 304 LPF unit
305 Time averaging unit
350 Storage unit
400 Target sound waveform extraction unit
450 Transfer characteristic calculation unit
460 Inverse fast Fourier transform unit
480 Filter unit
500 Determination unit
1000, 1000A, 1000B Multi-input noise suppression device

The invention claimed is:

1. A multi-input noise suppression device which performs a process using a main signal and at least one noise reference signal, the main signal including a target sound component and a noise component, the noise reference signal including a noise component, and said multi-input noise suppression device comprising:

a power spectrum calculation unit configured to perform a calculation process to obtain a main power spectrum of the main signal and a reference power spectrum of the noise reference signal, after each expiration of a unit clock time corresponding to a unit of sound processing;

a power spectrum estimation unit configured to perform, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and a coefficient update unit configured to update, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein said power spectrum estimation unit is configured to, in the estimation process, (i) obtain the estimated target power spectrum by at least multiplying the reference power spectrum calculated upon an expiration of a $k+1^{th}$ unit clock time by the first weight coefficient updated by said coefficient update unit upon an expiration of a $k^{th}$ unit clock time, and (ii) output the obtained estimated target power spectrum, k being an integer equal to or greater than 1.

2. The multi-input noise suppression device according to claim 1, wherein said power spectrum estimation unit is configured to at least subtract the first calculated value from the main power spectrum to obtain the estimated target sound power spectrum that is different from a result obtained by simply subtracting the first calculated value from the main power spectrum.

3. The multi-input noise suppression device according to claim 1, wherein said coefficient update unit is configured to update the first weight coefficient and the second weight coefficient according to a least mean square (LMS) method so that a difference between the main power spectrum and the second calculated value approximates to zero.

4. The multi-input noise suppression device according to claim 1, wherein said coefficient update unit is configured to update the first weight coefficient and the second weight coefficient so that each of the first weight coefficient and the second weight coefficient is nonnegative.

5. The multi-input noise suppression device according to claim 1, wherein said power spectrum estimation unit includes a filter calculation unit having a filter characteristic dependent on a difference between the main power spectrum and the first calculated value, and said filter calculation unit is configured to obtain the estimated target sound power spectrum by filtering the main power spectrum using the filter characteristic.

6. The multi-input noise suppression device according to claim 1, wherein said multi-input suppression device performs a process using a plurality of noise reference signals, and one of a plurality of reference power spectrums respectively corresponding to the plurality of noise reference signals is a fixed value.

7. The multi-input noise suppression device according to claim 1, wherein said power spectrum calculation unit is configured to calculate the main power spectrum and the reference power spectrum on a frame-by-frame basis, after each expiration of the unit clock time, said power spectrum estimation unit is configured to obtain the estimated target sound power spectrum on a frame-by-frame basis, after each expiration of the unit clock time, said coefficient update unit includes a time averaging unit configured to calculate a time average indicating an average per frame for each of the reference power spectrum and the estimated target sound power spectrum, and said coefficient update unit is configured to update the first weight coefficient and the second weight coefficient so that the time average of the main power spectrum calculated by said time averaging unit approximates to a value dependent on a sum of the time average of the reference power spectrum and the time average of the estimated target sound power spectrum.

8. The multi-input noise suppression device according to claim 1, further comprising a target sound waveform extraction unit configured to estimate the power spectrum of the target sound using the first weight coefficient and the second weight coefficient updated by said coefficient update unit, and at least perform a transform to express the estimated power spectrum of the target sound in a time domain so as to extract a signal waveform of the target sound.

9. The multi-input noise suppression device according to claim 1, further comprising:

a main microphone which has a sensitivity in a direction of an output source of the target sound and receives the main signal; and a reference microphone which has a least or minimum sensitivity in the direction of the output source of the target sound and receives the noise reference signal.

10. The multi-input noise suppression device according to claim 1, wherein, whenever updating the first weight coefficient, said coefficient update unit is configured to output the updated first weight coefficient, and said multi-input noise suppression device further comprises a storage unit configured to, every time the coefficient update unit outputs the first weight coefficient, store the first weight coefficient outputted most recently from said coefficient update unit.

11. The multi-input noise suppression device according to claim 1, further comprising a determination unit configured to determine whether or not the number of updates performed by said coefficient update unit on the first weight coefficient and the second weight coefficient is a predetermined number of times or more, wherein said power spectrum estimation unit is configured to perform the estimation process when said determination unit determines that the number of updates is smaller than the predetermined number of times, and said coefficient update unit is configured to update the first weight coefficient and the second weight coefficient using the first weight coefficient and the second weight coefficient updated last time, when said determination unit determines that the number of updates is smaller than the predetermined number of times.

12. A multi-input noise suppression method for performing a process using a main signal and at least one noise reference signal, the main signal including a target sound component and a noise component, the noise reference signal including a noise component, and said multi-input noise suppression method comprising:

performing a calculation process to obtain a main power spectrum of the main signal and a reference power spectrum of the noise reference signal, after each expiration of a unit clock time corresponding to a unit of sound processing;

performing, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and updating, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein, in said performing an estimation process, (i) the estimated target power spectrum is obtained by at least multiplying the reference power spectrum calculated upon an expiration of a $k+1^{th}$ unit clock time by the first weight coefficient updated upon an expiration of a $k^{th}$ unit clock time, and (ii) the obtained estimated target power spectrum is outputted, k being an integer equal to or greater than 1.

13. A non-transitory computer-readable recording medium for use in a computer which performs a process using a main signal and at least one noise reference signal, the main signal including a target sound component and a noise component, the noise reference signal including a noise component, and the recording medium having a computer program recorded thereon for causing the computer to execute:

performing a calculation process to obtain a main power spectrum of the main signal and a reference power spectrum of the noise reference signal, after each expiration of a unit clock time corresponding to a unit of sound processing;

performing, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and updating, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein, in said performing an estimation process, (i) the estimated target power spectrum is obtained by at least multiplying the reference power spectrum calculated upon an expiration of a $k+1^{th}$ unit clock time by the first weight coefficient updated upon an expiration of a $k^{th}$ unit clock time, and (ii) the obtained estimated target power spectrum is outputted, k being an integer equal to or greater than 1.

14. An integrated circuit which performs a process using a main signal and at least one noise reference signal, the main signal including a target sound component and a noise component, the noise reference signal including a noise component, and said integrated circuit comprising:

a power spectrum calculation unit configured to perform a calculation process to obtain a main power spectrum of the main signal and a reference power spectrum of the noise reference signal, after each expiration of a unit dock time corresponding to a unit of sound processing;

a power spectrum estimation unit configured to perform, every time the calculation process is performed, an estimation process to obtain an estimated target sound power spectrum that is assumed to be a power spectrum of a target sound, based on the main power spectrum and on a first calculated value obtained by at least multiplying the reference power spectrum by a first weight coefficient; and a coefficient update unit configured to update, every time the estimation process is performed, the first weight coefficient and a second weight coefficient so that a second calculated value approximates to the main power spectrum, the second calculated value being obtained by adding at least two values obtained by multiplying the reference power spectrum and the estimated target sound power spectrum by the first weight coefficient and the second weight coefficient, respectively, wherein said power spectrum estimation unit is configured to, in the estimation process, (i) obtain the estimated target power spectrum by at least multiplying the reference power spectrum calculated upon an expiration of a $k+1^{th}$ unit clock time by the first weight coefficient updated by said coefficient update unit upon an expiration of a $k^{th}$ unit clock time, and (ii) output the obtained estimated target power spectrum, k being an integer equal to or greater than 1.

* * * * *